United States Patent [19]

Ido

[11] Patent Number: 5,718,768

[45] Date of Patent: Feb. 17, 1998

[54] APPARATUS FOR PRODUCING GEL-COATED SEEDS

[75] Inventor: Yoichi Ido, Susono, Japan

[73] Assignee: Yazaki Corporation, Tokyo, Japan

[21] Appl. No.: 724,665

[22] Filed: Oct. 1, 1996

[30] Foreign Application Priority Data

Oct. 3, 1995 [JP] Japan ................................. 7-256282

[51] Int. Cl.⁶ ................................................. B05C 3/00
[52] U.S. Cl. .................... 118/712; 118/13; 118/26; 118/30; 118/400; 118/407
[58] Field of Search ................... 118/712, 13, 26, 118/30, 400, 407; 427/4, 8

[56] References Cited

U.S. PATENT DOCUMENTS

| 4,806,357 | 2/1989 | Garrett et al. ........................ 118/712 |
| 5,080,925 | 1/1992 | Kouno ..................................... 427/4 |
| 5,254,358 | 10/1993 | Kouno et al. ........................... 427/4 |

FOREIGN PATENT DOCUMENTS 4-141005  5/1992  Japan .

*Primary Examiner*—Laura Edwards
*Attorney, Agent, or Firm*—Armstrong, Westerman, Hattori, McLeland & Naughton

[57] ABSTRACT

Each suction tip on a support member is moved between a seed-sucking position and a seed-supplying position by a drive source (20) at a supplying unit, and a seed vessel is moved up and down by a drive source (40). A pressurizing plunger is moved front by a drive source (50) at a nozzle unit and pressurizes the gel inside a gel flow channel to move a cutting plunger up and open a valve to allow gel to be discharged. A part of the gel discharged drops, and the remainder forms a layer on which a seed is supplied. A counter of a controller counts the number of unsuccessful seed-sucking operations, and when the counted value reaches a predetermined number of times, the running of the apparatus is stopped. If a suction tip does not suck a seed at the seed-supplying position, instead of moving the pressurizing plunger front, another suction tip is moved to the positions. The running of the apparatus is automatically stopped when the seed vessel becomes empty of seeds, thereby eliminating the necessity for constant monitoring and preventing the production of capsules with no seed therein.

4 Claims, 14 Drawing Sheets

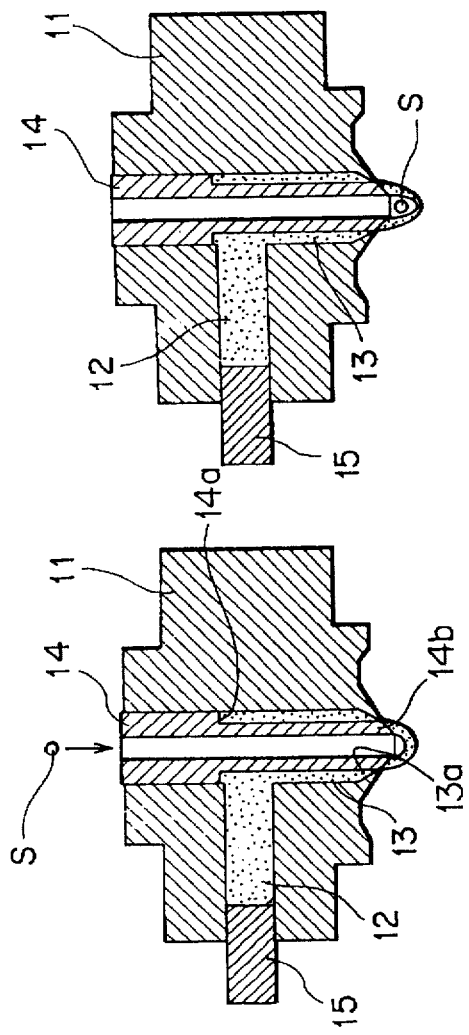
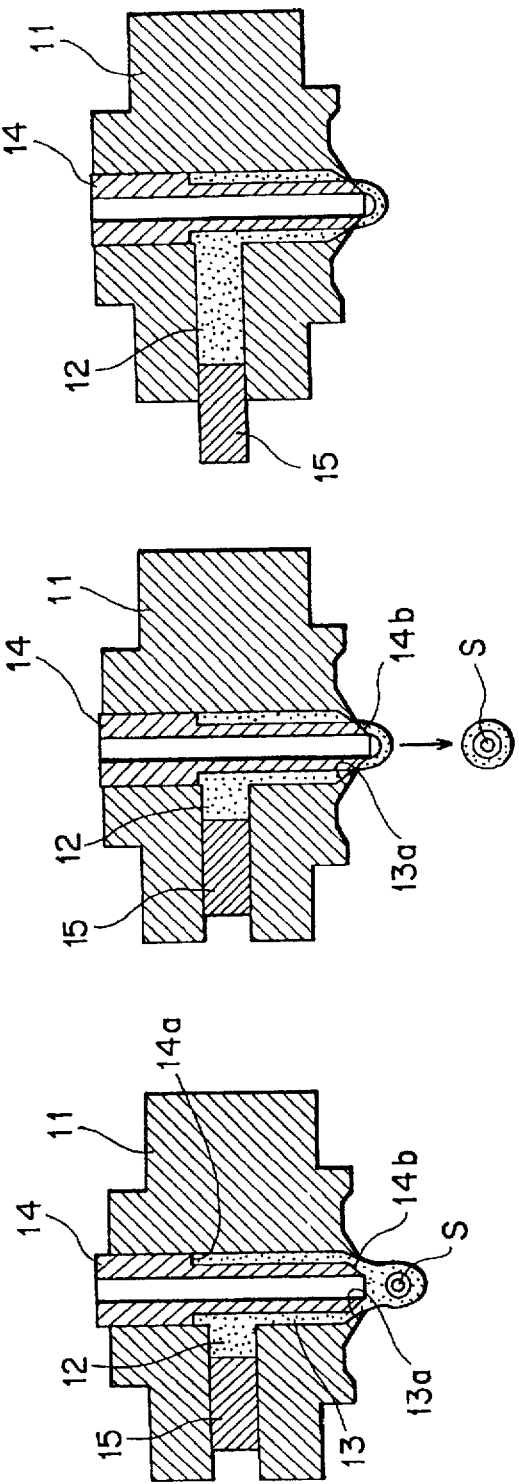
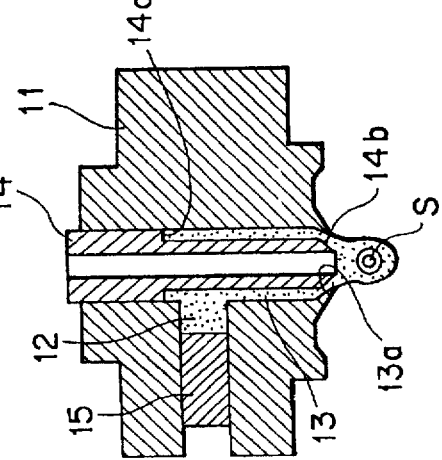

FIG. 15

| STATE / INPUT | STOP | ROTARY/PLUNGER ORIGIN RETURNING | ROTARY ORIGIN RETURNING | PLUNGER ORIGIN RETURNING | SUCKING/SUPPLYING | SUCKING | SUPPLYING | ROTARY ROTATION |
|---|---|---|---|---|---|---|---|---|
|  | 0 | 1 | 2 | 3 | 4 | 5 | 6 | 7 |
| START | 1 |  |  |  |  |  |  |  |
| PERSONAL COMPUTER END |  | ROTARY/PLUNGER FORCED STOP | DITTO | DITTO | 0 | 0 | 0 | PROCESS TARGET CHANGE 7 |
| SUCTION COMPLETE |  |  |  |  | RETURN | RETURN | RETURN |  |
| SUCTION PROCESS |  |  |  |  | 6 | ROTARY MOVEMENT START 7 |  |  |
| SUPPLY COMPLETE |  |  |  |  |  |  | ROTARY MOVEMENT START 7 |  |
| SUPPLY PROCESS |  |  |  |  |  |  |  |  |
| ROTARY STOP |  |  | SUCTION START 3 |  |  |  |  | SUCTION START SUPPLY START 4 |
| ROTARY PROCESS |  |  | 4 |  |  |  |  |  |
| PLUNGER STOP |  |  |  | SUCTION START 2 |  |  |  |  |
| PLUNGER PROCESS |  |  |  | 4 |  |  |  |  |

NUMBER OF THE PROCESSED CLEAR
ALL SOLENOIDS OFF
ORIGIN RETURN START

APPARATUS FOR PRODUCING GEL-COATED SEEDS

BACKGROUND OF THE INVENTION

1. Field of the Invention

This invention relates to an apparatus for producing gel-coated seeds, and more particularly to an apparatus for producing gel-coated seeds in which seeds are coated and protected with a gel containing nutrients, sterilizers and the like, and in which seeds, coated with such gel, becomes sphericalized and large in diameter to facilitate their sowing.

2. Description of the Related Art

A conventional gel-coated seed producing apparatus of this type is known from Japanese Patent Application Laid-Open Specification No. 4-141005. This gel-coated seed producing apparatus is provided with a nozzle unit in which a layer of gel is formed and cut by the opening and closing of a cutting plunger; a seed-supplying unit including a seed vessel upwardly and downwardly movably provided, an arm that has a shift of rotation at a center thereof and suction tips at opposite ends, and pipeways that communicate the suction tips via magnetic valves to negative pressure and air pressure sources; a curing vessel disposed below the above-mentioned nozzle unit; and a controller that controls in synchronism the operations of the nozzle unit and the seed vessel and arm of the seed-supplying unit.

In the construction of this related art, when one suction tip is positioned just above the seed vessel through the rotation of the arm, the seed vessel is moved upwardly from a lowered position, and the one suction tip is inserted into the seeds inside the seed vessel, while its pipeway is communicated to the related negative pressure source by the change-over of the magnetic valve, so that a seed is vacuum-attracted or sucked to the front end of the suction tip. The seed vessel is then lowered, the arm is rotated for positioning the one suction tip, and the one suction tip is communicated, by changing over the magnetic valve, to the related air pressure source so that the seed is dropped and supplied.

In the nozzle unit, the seed dropped and supplied on the layer of gel formed at the lower end of the plunger hole is coated with the gel that flows out when the cutting plunger opens the valve. The cutting plunger closes the valve to stop the outflow of gel when a predetermined amount of gel has flown out, at which time the gel layer with the seed enclosed therein, which can no longer sustain its own weight, drops. A part of the gel that remains at the lower end of the plunger hole forms a new layer. The gel-coated seed, while sphericalized during its falling, drops into the curing agent in the curing vessel and is cured at its surface.

With the construction as described above, all the steps of processing such as the supply of seeds, coating with gel, curing of surface layers of the coating and so forth are automatically continuously done with efficiency. The gel with which a seed is coated, is sphericalized and becomes large in diameter, and is hardened to a certain depth thereof without hardening the seed itself. Thus, there are obtained coated seeds adapted for sowing and having a high rate of germination. Further, since no external forces are applied on the seed or the surface of the gel coating during the steps of processing, the seed and the surface of the gel coating will be kept away from damages or deformations.

In the above-mentioned related-art apparatus, when a suction tip is inserted into the seeds in the seed vessel, the magnetic valve is changed over to communicate the suction tip to a negative pressure source so that it sucks a seed at its front end. It is often the case, however, that a seed is not successfully sucked at one seed-sucking action. Therefore, it is so controlled that in case of failure, the seed-sucking action is repeated until a seed is successfully sucked.

For this reason, even if the seed vessel has become empty of seeds, a retry for a seed is repeated until the operator switches off the apparatus. Thus, if the producing apparatus is run unattended, it is possible that contrary to the expectation that the operation of coating a predetermined number of seeds is being under way, the seed-attracting action is repeated to prevent the cource of the coating operation from advancing. Thus, a frequent monitoring by an operator has been required.

Further, even if a seed is sucked in the seed-attracting operation and such is confirmed, it is possible that the seed accidentally drops in the course of its movement from the seed-attracting position to the seed-supplying position, resulting in a capsule of gel containing no seed. Consequently, it is required that a gel-coated seed, after its coating has cured, is subjected to a troublesome sorting operation by an operator in which whether a seed is really contained in the capsule of gel is inspected.

SUMMARY OF THE INVENTION

This invention has been accomplished to overcome the above drawbacks and an object of this invention is to provide an apparatus for producing gel-coated seeds in which control is made to automatically stop its running when the seed vessel has come empty of seeds, thereby to make it unnecessary to monitor its running all the time.

Another object of this invention is to provide an apparatus for producing gel-coated seeds in which it is detected when a seed vacuum-attracted accidentally drops before supplied to a layer of gel, and control is made so that a capsule of gel with no seed therein is prevented from being produced.

In order to attain the objects described above, according to this invention, there is provided an apparatus for producing gel-coated seeds, which comprises as shown in the diagram of basic construction of FIG. 1: a seed-supplying unit (B) and a nozzle unit (A), the seed-supplying unit (B) comprising a support member (21); a plurality of suction tips (23, 24) fitted to the support member; a first drive source (20) for rotationally reciprocatingly driving the support member such that each of the suction tips is successively moved between a seed-sucking position and a seed-supplying position; a seed vessel (31) containing seeds to be sucked to the suction tips, the seed vessel being upwardly and downwardly movably disposed corresponding to the seed-sucking position; and a second drive source (40) for driving the seed vessel upwardly and downwardly, the nozzle unit (A) comprising a gel flow channel (12) filled with gel; a gel-pressurizing plunger (15) reciprocatably inserted into the gel flow channel, which plunger, when moving front, pressurizes the gel inside the gel flow channel and, when moving back, causes additional gel to flow into the gel flow channel; a cutting plunger (14) with a hollow portion axially extended therethrough, which cutting plunger opens a valve when the gel inside the gel flow channel is pressurized to allow gel to flow out, a part of the gel thus discharged dropping by its own weight and a remainder forming a layer of gel that closes the hollow portion at a lower end thereof; and a third drive source (50) for driving the gel-pressurizing plunger to reciprocate in the gel flow channel, the nozzle unit being disposed corresponding to the seed-supplying position and coating a seed with gel, which has been dropped and supplied from the seed-supplying unit through the hollow portion of the cutting plunger, the apparatus for producing gel-coated seeds further comprising a controller (100) for controlling the first drive source to move the suction tips between the seed-sucking position and the seed-supplying position, controlling the second drive source when one of the suction tips has moved to the seed-sucking position to move the seed vessel upwardly to allow the one suction tip to suck a seed thereto, having the sucking operation repeated if the one suction tip fails to suck a seed by the first-mentioned sucking operation, controlling the first drive source to move the one suction tip with a seed sucked thereto at the seed-sucking position to the seed-supplying position, releasing the suction at the seed-supplying position to allow the one suction tip to drop the seed to be supplied through the hollow portion of the cutting plunger, and controlling the third drive source to move the gel-pressurizing plunger front so that the cutting plunger opens the valve to allow gel to flow out, wherein the controller includes a counter means (103-1) for counting the number of sucking operations in which one suction tip fails to suck a seed at the seed-sucking position, and the apparatus is stopped at the sucking operation when the counted value of the counter means arrives at a predetermined number of times.

In the construction as mentioned above, in the seed-supplying unit (B) of the gel-coated seed producing apparatus, each of the plurality of suction tips (23, 24) fitted to the support member (21) is successively moved to and fro between the seed-sucking position and the seed-supplying position by the rotation of the support member which is caused by the first drive source (20). The seed vessel (31), which contains seeds to be sucked by suction tips, is disposed corresponding to the seed-sucking position and driven by the second drive source (40) to move upwardly and downwardly.

In the nozzle unit (A) of the gel-coated seed producing apparatus disposed corresponding to the seed-supplying position, when the gel-pressurizing plunger (15) is moved front-which is inserted into the gel flow channel (12) filled with gel and reciprocatably driven by the third drive source (50), it applies pressure on the gel, and when moved back, it causes additional gel to be supplied into the gel flow channel. The gel pressurized causes the hollow cutting plunger (14) to open the valve to allow gel to be discharged, so that a part of the thus discharged gel drops by its own weight and the remainder of the gel forms a layer of gel which closes the lower end of the plunger hollow portion, and on which a seed is dropped and supplied through the plunger hollow portion to be subsequently coated with gel.

The controller (100) of the gel-coated seed producing apparatus controls the first drive source to alternately move the suction tips to the seed-sucking position, and on arrival of one suction tip at the seed-sucking position, controls the second drive source to move the seed vessel upwardly so that the suction tip sucks a seed thereto. If the suction tip cannot suck a seed by this sucking operation, the sucking operation is repeated. The suction tip, after having sucked a seed at the seed-sucking position, is moved to the seed-supplying position by controlling the first drive source. The suction is released at the seed-supplying position to allow the seed to be dropped and supplied through the plunger hollow portion, and the third drive source is controlled to move the gel-pressurizing plunger front and thus the hollow cutting plunger upwardly to open the valve and allow gel to flow out.

The counter means (103-1) counts the number of seed-sucking operations which end in failure, and the controller, when the counted value of the counter means has reached a predetermined number of times, stops the running of the apparatus at the seed-sucking operation. Thus, where a seed can no longer be sucked irrespective of the number of sucking operations for the reason that the seed vessel (31) has become empty of seeds or the like, the re-try is automatically stopped to discontinue the running of the apparatus.

Preferably, after a suction tip has sucked a seed at the seed-sucking position and has been moved to the seed-supplying position, the controller confirms whether the suction tip is sucking the seed at the seed-supplying position, stops the forward movement of the gel-pressurizing plunger when the suction of the seed cannot be confirmed, and moves another suction tip, which has sucked a seed at the seed-sucking position, to the seed-supplying position.

With the construction as mentioned above, if the suction tip sucks no seed at the seed-supplying position due to, for example, its accidental dropping in the course of movement of the suction tip to the seed-supplying position, the gel-pressuring plunger is stopped from moving in the gel-pressurizing direction. Consequently, the production of capsules is prevented which have no seed contained therein.

The above and other objects, features and advantages of this invention will become apparent from the following description and the appended claims, taken in conjunction with the accompanying drawings in which like parts or elements are denoted by like reference characters.

BRIEF DESCRIPTION OF THE DRAWINGS

FIGS. 6A to 6E are explanatory views showing the way of gel-coating in the nozzle unit of FIG. 5;

FIG. 15 is a diagram showing a part of the state-transition which the CPU as in FIG. 7 refers to execute its processing.

DESCRIPTION OF THE PREFERRED EMBODIMENT

Embodiments of this invention will now be described with reference to the attached drawings.

Figure 1:
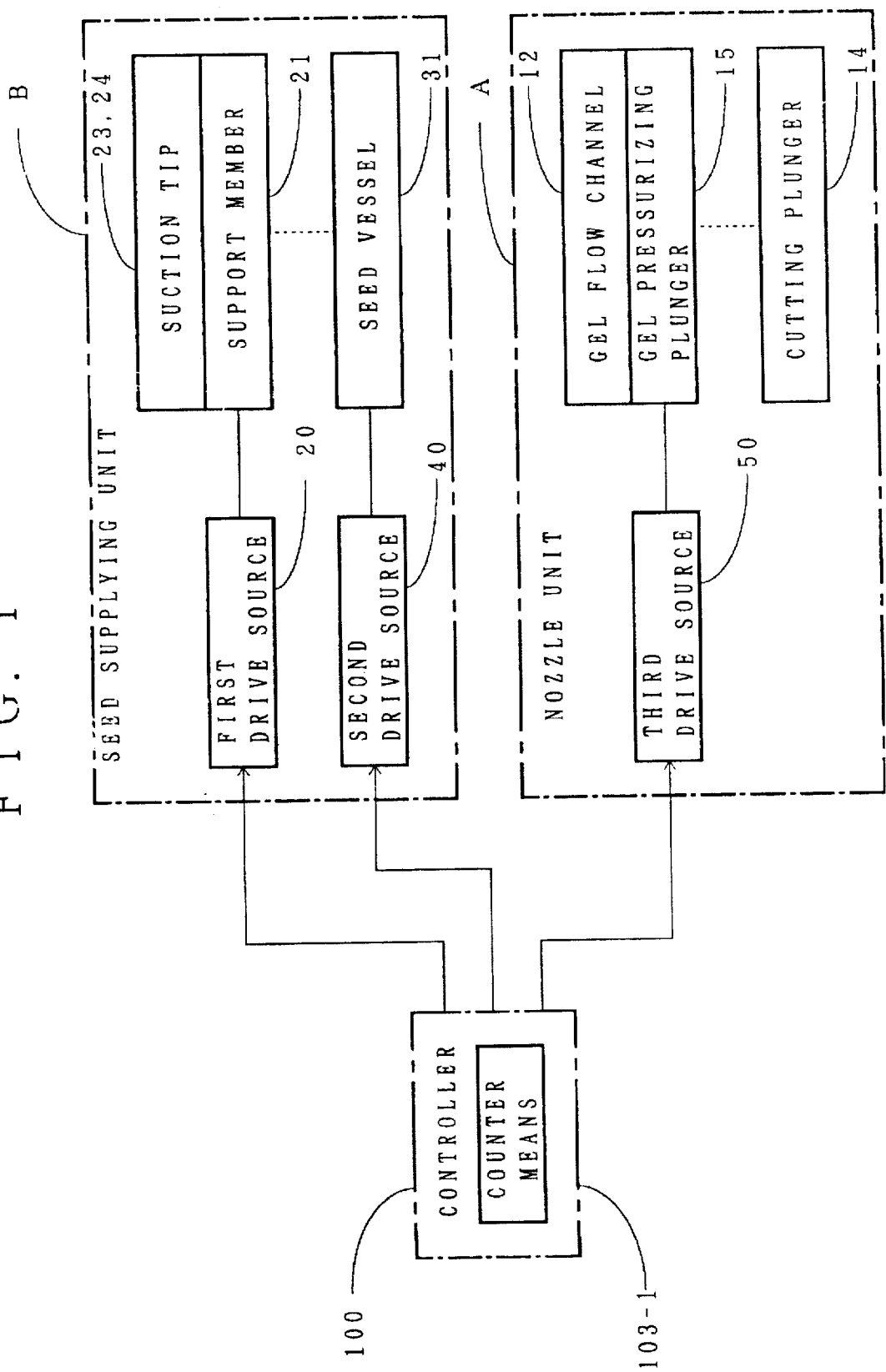
FIG. 1 is a block diagram showing the basic construction of an apparatus for producing gel-coated seeds according to this invention.
Figure 2:
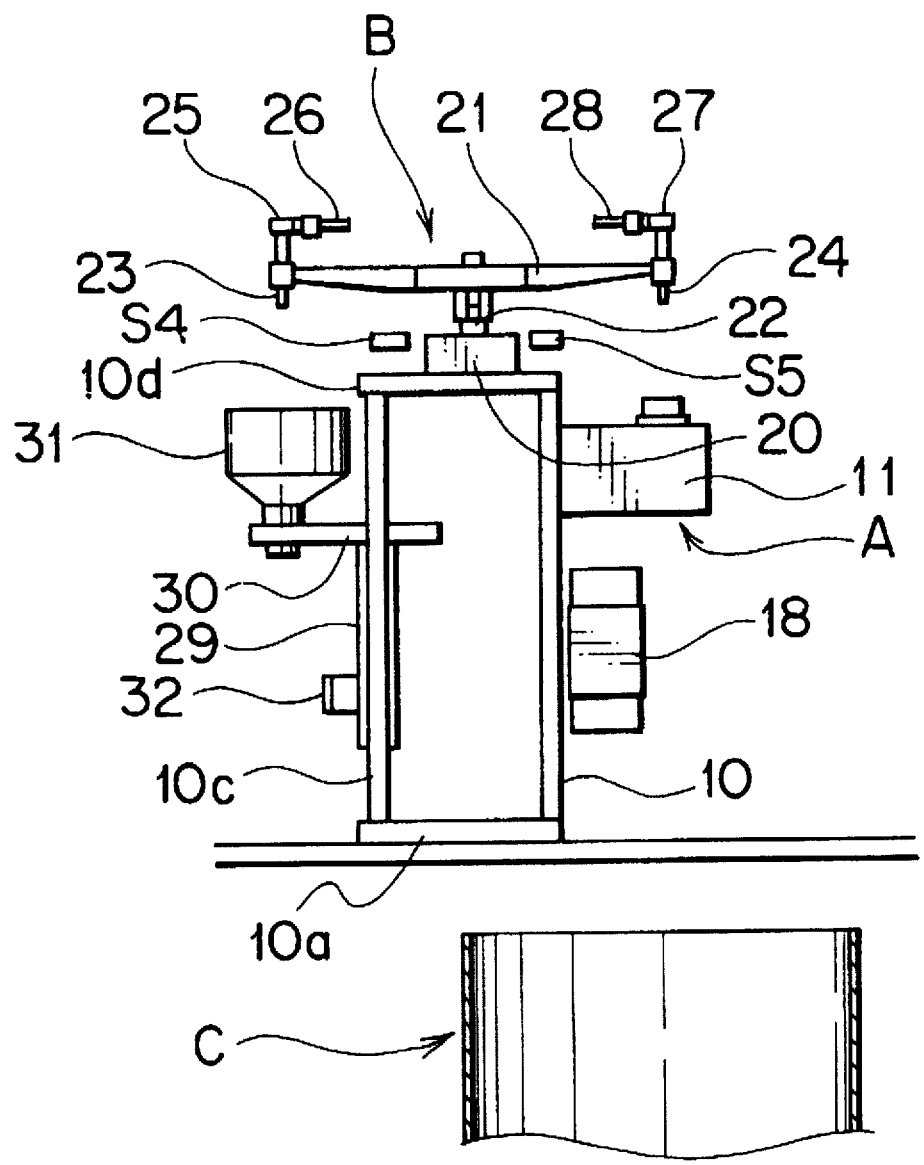
FIG. 2 is a front view of an apparatus for producing gel-coated seeds according to one embodiment of this invention.
Figure 3:
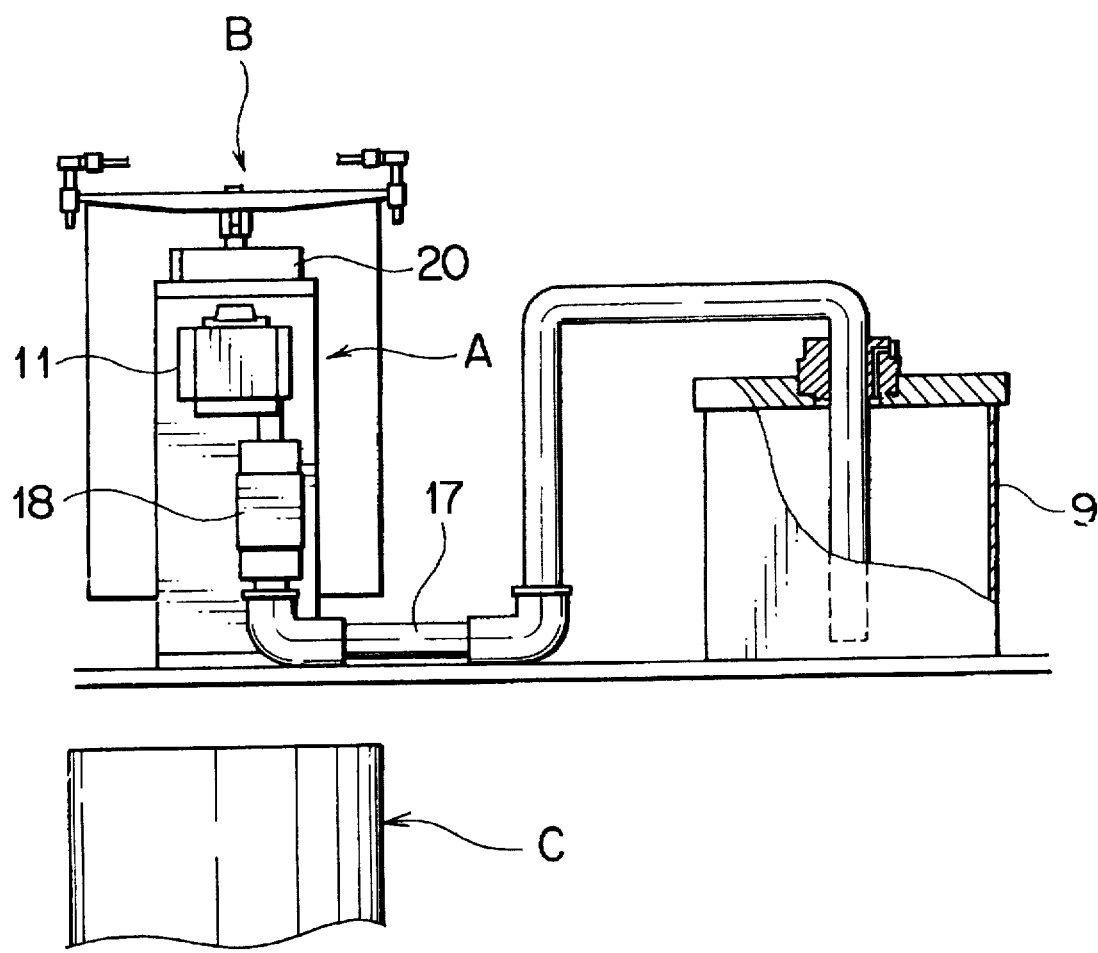
FIG. 3 is a side view of the apparatus as shown in FIG. 2.
Figure 4:
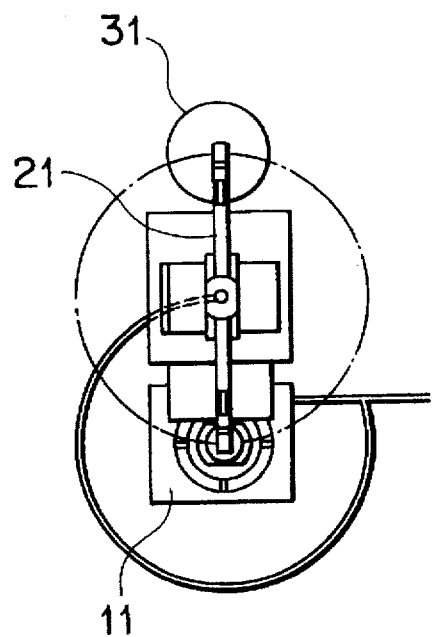
FIG. 4 is a plan view of the apparatus as shown in FIG. 2.

FIGS. 2 to 4 show a gel-coated seed producing apparatus according to this invention, which is made up of a nozzle unit A for forming coats of gel and their cutting, a seed-supplying unit B for supplying seeds to the nozzle unit A, a curing agent vessel C disposed under the nozzle unit A and so forth.

Figure 5:
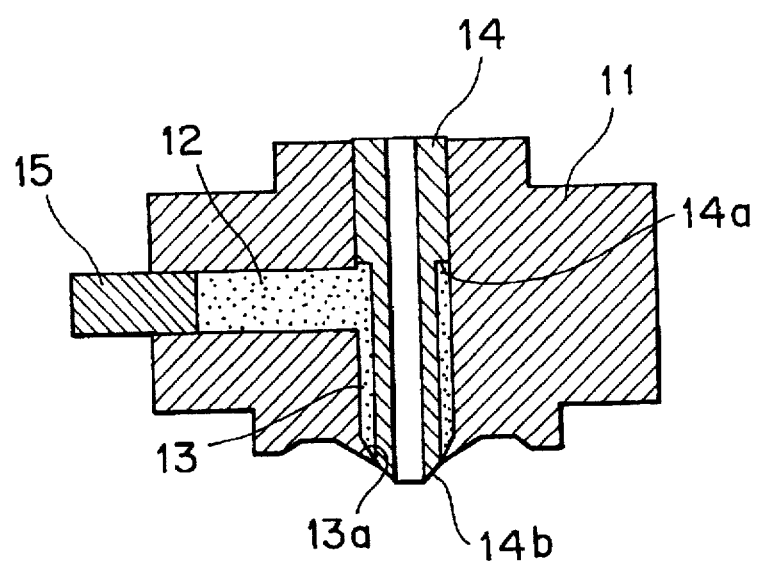
FIG. 5 is a sectional and partially broken view of a nozzle unit of the apparatus as shown in FIGS. 3 and 4.

A nozzle main body 11 of the nozzle unit A, as shown in FIG. 5, has a gel flow channel 12 formed therein, which is communicated to a plunger hole 13 vertically extending through the main body 11. The plunger hole 13 is at the lower end formed with a valve seat 13a and has a cylindrical cutting plunger 14 inserted thereinto. The cutting plunger 14 has a pressure-receiving step 14a at an intermediate height on its outer periphery and a tapered valve 14b at its lower end. The cutting plunger 14 is at the top surface pressed by a spring (not shown) to seat the valve 14b on the valve seat 13a.

Into the gel flow channel 12 is inserted a gel-pressurizing plunger 15 which is reciprocated by a reciprocating actuator (not shown) as a third drive source comprised, e.g. of an air cylinder. If the plunger 15 is pushed in the direction of pressurizing the gel inside the gel flow channel 12, the gel pushes the pressure-receiving portion 14a to move the cutting plunger 14 upwardly and open the valve, so that gel flows out. When the movement of the plunger 15 in the gel-pressurizing direction is stopped, the valve is closed by the cutting plunger 14 to stop the outflow of the gel. The moving front and back of the reciprocating actuator are changed through later-described push solenoid valve solenoid SOL1 and pull solenoid valve solenoid SOL2, which are selectively energized.

If the plunger 15 is pulled in the direction of depressurizing the gel inside the gel flow channel 12, additional gel is supplied from a gel-storing tank 9 via a pipeway 17 and a ball-constituted check valve 18 to the gel flow channel 12, as shown in FIG. 3. The gel inside the gel flow channel 12 flows out when the cutting plunger 14 is opened by the movement of the plunger 15 in the gel-pressurizing direction.

A supporting arm 21 has a rotation support shaft 22 at a central portion thereof, which is coupled to a rotary actuator 20 as a first drive source comprised, e.g. of an air cylinder, and suction tips 23, 24 rigidly fixed and supported at respective opposite ends thereof. A flexible pipeway 28 has one end thereof connected to a pipe fitting 25 at the upper end of the suction tip 23 and the other end connected through a later-described solenoid valve to air pressure and negative pressure sources. A later-described suction pressure sensor S1 is provided in the pipeway 26 for detecting when the pressure inside the pipeway has gone negative to a predetermined degree.

The forward and reverse rotations of the rotary actuator 20 are changed through later-described forward rotation solenoid valve solenoid SOL3 and reverse rotation solenoid valve solenoid SOL4 which are selectively energized. Each suction tip 23, 24 is changed to be communicated to the negative pressure source or the air pressure source through later-described suction solenoid valve solenoid SOL5 and supply solenoid valve solenoid SOL6 which are selectively energized.

Likewise, a flexible pipeway 28 has one end thereof connected to a pipe fitting 27 at the upper end of the suction tip 24 and the other end connected through a solenoid valve (not shown) to air pressure and negative pressure sources. A later-described suction pressure sensor S2 is provided in the pipeway 28 for detecting when the pressure inside the pipeway has gone negative to a predetermined degree.

A slider 29 is fitted around a linear shaft 10c of a mount table 10. The table mount 10 includes horizontal members 10a and 10d. The slider 29 is moved up and down by an elevation actuator (not shown) as a second drive source comprised, e.g. of a straight motion air cylinder. A plate 30 is provided at an upper end of the slider 29 and has a seed vessel 31 mounted at an end thereof. On a bracket 32 mounted on a lateral side of the slider 29, a rise detection sensor S3 is provided for detecting the height where the seed vessel 31 has moved. The upward and downward movements of the elevation actuator are changed through later-described rise solenoid valve solenoid SOL7 and fall solenoid valve solenoid SOL 8 which are selectively energized.

The rotary actuator 20 is forwardly and reversely rotatable within the range of 180° so that the suction tips 23, 24 are alternately positioned just above the cutting plunger 14 of the nozzle unit A and the seed vessel 31. When the suction tip 23, 24 is just above the cutting plunger 14, it is confirmed by a rotary position detecting sensor S4 provided in the vicinity of the rotary shaft 22, and when just above the seed supply vessel 31, it is confirmed by a rotary position detecting sensor S5 in the vicinity of the rotary shaft 22.

Thus, in the seed-supplying unit B, the suction tip 23 or 24 vacuum-attracts a seed from the seed vessel 31 when the latter moves up, and is then, through the rotation of the arm 21, positioned just above the cutting plunger 14 of the nozzle unit A to drop the seed to the nozzle unit A.

In the construction as described above, before automatic running is started, as shown in FIG. 4, one suction tip 23 is just above the seed vessel 31, while the other suction tip 24 is above the cutting plunger 14 of the nozzle unit A, and the position of the suction tip 23 is being confirmed by the rotary position detecting sensor S4 (FIG. 2). And, it is being confirmed by a fall detection sensor S6 that the seed vessel 31 is at a lowered position. The pipeway 26 of the suction tip 23 and the pipeway 28 of the suction tip 24 are not being connected to the air pressure and negative pressure sources, with neither of the solenoid valve solenoids SOL6 and SOL7 being energized. Further, as shown in FIG. 5, the gel-pressurizing plunger 15 is at a position fully-moved in the pull direction, having completed the reducing of the pressure on the gel inside the gel flow channel 12 and supplying of additional gel from the gel-storing tank 9 to the gel flow channel 12.

To start the automatic running, through remote operation with a not-shown personal computer or through operation of an automatic running button at an operation unit (not shown), the rise solenoid valve solenoid SOL7 is energized to open the air pressure circuit of the elevation actuator so that the elevation actuator moves the slider 29 and thus the seed vessel 31 upwardly. When it is detected by the rise detection sensor S3 that the seed vessel 31 has arrived at a predetermined height, the rise solenoid valve solenoid SOL7 is deenergized to stop the operation of the elevation actuator and hold the seed vessel 31 at the raised position. The suction solenoid valve solenoid SOL5 is energized to communicate the pipeway 26 of one suction tip 23 to a negative pressure source, and the one suction tip 23, inserted into the seeds inside the raised seed vessel 31, sucks a seed thereto.

If the suction tip 23 sucks a seed, an increase is made in the negative pressure inside the pipeway 26, and the suction pressure sensor S1 detects that the pressure inside the pipeway 28 has gone negative to a predetermined degree. When it is confirmed by the ON of the suction pressure sensor S1 that the suction tip 23 has sucked a seed, the fall solenoid valve solenoid SOL8 is energized so that the elevation actuator is operated in the downward direction to move the seed vessel 31 downwardly. If the pressure inside the pipeway 28 does not go negative to a predetermined degree, the rise solenoid valve solenoid SOL7 is again energized to repeat the operation for the suction tip 23 to suck a seed. Each time when such a retry is made, a later-described retry counter increments to count the number of retries.

When the suction of a seed is confirmed by the suction pressure sensor S1, the fall solenoid valve solenoid SOL8 is energized so that the elevation actuator is operated in the downward direction to lower the seed vessel 31. When the completion of the lowering of the seed vessel 31 is confirmed by the fall detection sensor S8, the forward rotation solenoid valve solenoid SOL3 is operated to forwardly rotate the rotary actuator 20 so that the one suction tip 23 is positioned just above the cutting plunger 14 of the nozzle unit A. When positioned just above the cutting plunger 14, such is detected by the rotary position detecting sensor S5.

When the completion of positioning is detected by the rotary position detecting sensor S5, whether a seed is being sucked is once again confirmed by the suction pressure sensor S1. If the suction of a seed is confirmed, the suction solenoid valve solenoid SOL5 is deenergized to disconnect the pipeway 28 from the negative pressure source, followed by energizing the supply solenoid valve solenoid SOL8 to put the pipeway 28 in communication with the air pressure source, so that due to an increase in the pressure inside the pipeway 28, the seed is dropped to be supplied from the suction tip 23. In parallel with this, the rise solenoid valve solenoid SOL7 is energized to move the seed vessel 31 upwardly to allow the other suction tip 24 to suck a seed.

In synchronism with the supply of a seed as described above, the formation and cutting of a layer of gel is effected in the nozzle unit A. In other words, in the nozzle unit A, the push solenoid valve solenoid SOL1 is energized to move the gel-pressurizing plunger 15 in the push direction so that the cutting plunger 14, pressurized at the pressure-receiving portion 14a, moves upwardly to open the valve and allow gel to flow out and form a layer at the lower end of the plunger hole 13. The layer of gel thus formed droops by its own weight, and a seed is dropped and supplied thereto to be half enclosed in the drooping layer. On the subsequent closing of the cutting plunger 14, the gel layer is no longer capable of sustaining its own weight and drops into the curing agent in a curing vessel C, while sphericalized during its falling. Thereafter, the pull solenoid valve solenoid SOL2 is energized to move the gel-pressurizing plunger 15 in the pull direction, thereby causing additional gel to be supplied from the gel-storing tank 9 via the pipeway 17 and ball-constituted check valve 18 to the gel flow channel 12.

If, however, the suction of a seed is not confirmed by the above-mentioned suction confirmation operation, the push solenoid valve solenoid SOL1 is not energized, and instead, the reverse rotation solenoid valve solenoid SOL4 is energized to reversely rotate the rotary actuator 20, so that the other suction tip 24 with a seed—which seed was sucked by the other suction tip 24 in parallel with the seed-supplying operation by the suction tip 23—is positioned just above the cutting plunger 14 of the nozzle unit A, and the operation as described above is repeated.

Details of the coating with gel and its sphericalization as mentioned above will now be described with reference to FIGS. 6A to 6E. A part of the gel discharged remains and forms a layer at the lower end of the plunger hole 13. If a seed S is dropped on the layer of gel as shown in FIG. 6A, the seed is half enclosed in the drooping layer as shown in FIG. 6B. In this state, the push solenoid valve solenoid SOL1 is energized to move the plunger 15 into the gel flow channel as shown in FIG. 6C, resulting in the gel therein pressurized. The gel thus pressurized presses itself on the pressure-receiving portion 14a to move the cutting plunger 14 upwardly and open the valve, so that gel is discharged at the lower end of the plunger hole 13 and encloses the seed S. The movement of the plunger 15 is stopped by a not-shown stopper, and a predetermined time later the push solenoid valve solenoid SOL1 is deenergized, with the result that the cutting plunger 14 is closed and the layer of gel with the seed therein gravitationally drops, while sphericalized during its falling as shown in FIG. 6D. A part of the gel remains and forms at the lower end of the plunger hole 13 a new layer that droops by its own weight as shown in FIG. 6E.

Figure 7:
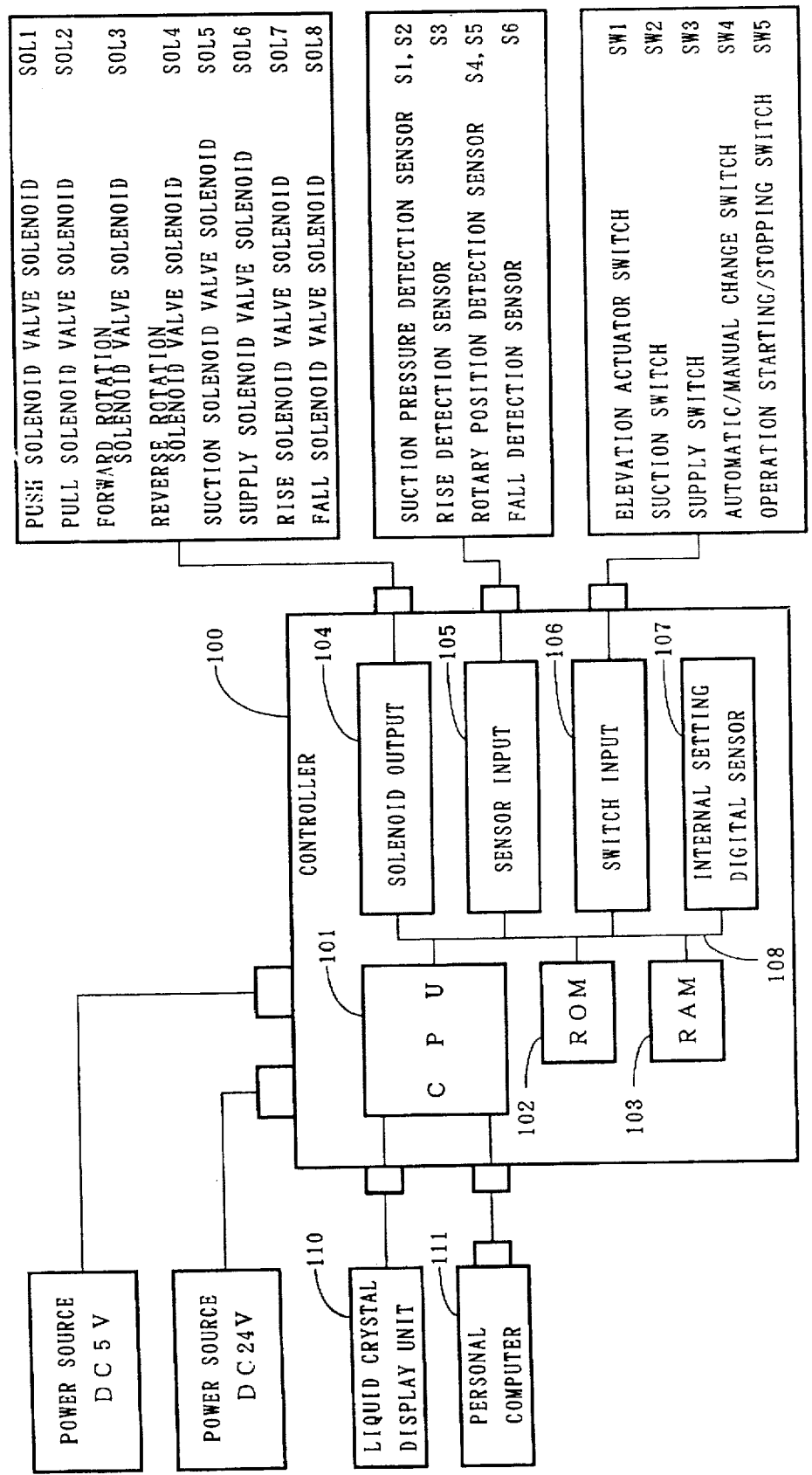
FIG. 7 is a block diagram showing the construction of the controller of the apparatus for producing gel-coated seeds.

The controller of the thus constructed gel-coated seed producing apparatus will now be described with reference to the circuit-construction showing block diagram of FIG. 7. In this figure, designated 100 is a controller which includes a central processing unit (CPU) 101 which operates in accordance with a predetermined program, a read-only memory (ROM) 102, a random access memory (RAM) 103, a solenoid output interface (IF) 104, a sensor input interface (IF) 105, a switch input interface (IF) 106 and an internal setting digital sensor 107, which are all mutually connected via a bus line 108.

To the CPU 101 is connector-connected a liquid crystal display unit 110 for displaying a processing performance, processing target, state of operation and the like, and the running in a manual mode when run in the manual mode. A personal computer 111 is also connected via a connector in accordance with RS232C to the CPU 101.

The personal computer 111 is used for setting parameters such as the processing target number of seeds, the energizing periods of time of solenoids, the number of times of retry for sucking a seed and the like, which are used for the control by the controller 100. These parameters set are transmitted to the controller 100 and stored in a predetermined area in the RAM 108 as rewritable storage means.

The processing target number of seeds is used for stopping the running when the processing performance number of seeds has reached the processing target number of seeds. The energizing periods of time of solenoids include, e.g. the energizing time of the supply solenoid valve solenoid for supplying a seed, and during these energizing periods, the rotary/plunger operation is not effected. The number of times of retry is the number of operations made for sucking a seed in case of failure.

To the solenoid output interface 104 are connected, via a single connector, the push and pull solenoid valve solenoids SOL1 and SOL2, forward and reverse rotation solenoid valve solenoids SOL3 and SOL4, suction and supply solenoid valve solenoids SOL5 and SOL6, and rise and fall solenoid valve solenoids SOL7 and SOL8, the SOL1 and SOL2 being used for on-driving the reciprocating actuator in the nozzle unit A so as to move the gel-pressurizing plunger 15 in the push and pull directions, respectively, the SOL3 and SOL4 being used for on-driving the rotary actuator 20 in the seed-supplying unit B so that it rotates forwardly and reversely, respectively, the SOL5 and SOL6 being provided for each suction tip 23, 24 for communicating each suction tip to negative pressure and air pressure sources, and the SOL7 and SOL8 being used for on-driving the elevation actuator so as to move the seed vessel 31 upwardly and downwardly, respectively.

To the sensor input interface 105 are connected, via a single connector, the suction pressure sensors S1 and S2, the rise detection sensor S3, the rotary position detecting sensors S4 and S5, and the fall detection sensor S6, the sensors S1 and S2 functioning as the suction detecting means for detecting a seed sucked to the suction tips 23 and 24, respectively, the sensor 3 being used for detecting when the seed vessel 31 is at the raised position, the sensors S4 and S5 being used for detecting when the suction tips 23 and 24 are respectively positioned just above the cutting plunger 14 of the nozzle unit A and the seed vessel 31, and the sensor S6 being used for detecting when the seed vessel 31 is at the lowered position.

To the switch input interface 106 are connected, via a single connector, various switches which are operated when run in a manual mode, namely, an elevation actuator switch which is operated when to on-drive the elevation actuator for moving the seed vessel 31 of the seed-supplying unit B upwardly and downwardly; a suction switch operated when to allow the suction tip 23, 24 to suck a seed; a supply switch operated when to allow a seed to be supplied from the suction tip 23, 24; an automatic/manual change switch operated when to change the automatic-running and manual-running modes; and an operation starting/stopping switch for manually operating the start and stop of the operation.

Description will now be made of the operation of the seed-supplying unit B in which the suction tip 23, 24 sucks a seed thereto on the side of the seed vessel 31 and supplies the seed therefrom on the side of the cutting plunger 14 of the nozzle unit A, and of the operation of the nozzle unit A in which the seed supplied is coated with gel.

The CPU 101 of the controller 100, prior to the suction and supply operations by the seed-supplying unit B, first confirms whether the reciprocating actuator and the rotary actuator are returned to their original positions (origins). After the above is confirmed, the suction and supply operations of a seed will be started.

The two suction tips 23 and 24 on the arm 21, when the arm 21 is at the initial position, are located just above the seed vessel 31 and the nozzle unit A, respectively.

In the origin returning operation, the arm 21 is fully rotated by the rotary actuator 20 in a counterclockwise direction, and in this state, the elevation actuator and thus the seed vessel 31 are moved upwardly so that the suction tip 23 sucks a seed. If the suction tip 23 is supplied with a negative pressure and a seed is sucked thereto, the negative pressure inside the suction tip 23 goes negative to an increased degree, and which is detected by the suction pressure sensor S1, making it possible to confirm the suction of a seed. In case the suction of a seed is not confirmed, the elevation actuator is lowered and another try is made. When it is confirmed by a signal from the suction pressure sensor that a seed is sucked, the initial seed-sucking operation is finished.

On completion of the initial sucking operation, the output shaft of the rotary actuator and thus the arm 21 are rotated clockwise by 180°. In this instance, the rotation of the arm 21 is effected after it is confirmed that the elevation actuator has lowered. If the rotary position detecting sensor S5 detects the arm 21, the rotary actuator 20 is stopped, and the suction tips 24 and 23 are respectively positioned just above the seed vessel 31 and the nozzle unit A.

in this position, a seed is sucked to the suction tip 24 and its confirmation is made as described above, while the suction tip 28, after the suction of a seed is confirmed, is communicated to the air pressure source and supplied with a positive pressure. The seed, blown out by air, drops to be supplied from the suction tip 23 on the layer of gel at the cutting plunger 14, followed by the operation of the reciprocating actuator. After completion of these suction and supply operations, the arm 21 is rotated counterclockwise by 180° so that the suction tips 23 and 24 return to their respective original positions just above the seed vessel 31 and the nozzle unit A.

If it is found as a result of the above confirmation that the suction tip 23 has no seed, the supply of air to the suction tip 23 and the operation of the reciprocating actuator will be skipped.

The control operation of the entire gel-coated seed producing apparatus will now be described. The arm 21 is rotated through the operation of the rotary actuator 20 and stops at a signal from the rotary position detecting sensor S5, so that the suction tips 23 and 24 are positioned just above the cutting plunger 14 of the nozzle unit A and the seed vessel 31, respectively.

The elevation actuator is then operated to move the seed vessel 31 upwardly. The suction tip 24 with a negative pressure thereinside comes close to the seeds inside the seed vessel 31 and vacuum-attracts one of the seeds, and the seed vessel 31 is then lowered. In parallel with this seed-sucking operation, the suction tip 23 with a seed sucked thereto, which is positioned just above the nozzle unit A, is supplied with a positive pressure and supplies the seed on the gel layer formed below the cutting plunger 14. After the almost simultaneous suction and supply of seeds, the rotary actuator 20 is again operated to rotate the arm 21 by 180°, and the same operation will be repeated.

In the nozzle unit A, the reciprocating actuator reciprocates under the control of the controller to move the plunger 15 in the push and pull directions to alternately increase and decrease the pressure on the gel inside the gel flow channel 12. When the gel is pressurized, the cutting plunger 14 opens the valve, and when depressurized, the supply of additional gel is effected.

When the valve is closed with the cutting plunger 14, the gel layer formed therebelow droops by its own weight, followed by the supply of a seed from the suction tip 23, 24, and when the valve is closed, the seed is enclosed with air bubbles in the gel discharged and gravitationally drops into the curing vessel C due to the increase in the weight.

Details of the control of the gel-coated seed producing apparatus as described above will now be described with reference to the flowcharts of FIGS. 8 to 14 showing the processes which the CPU 101 of the controller 100 performs in accordance with a predetermined program, and to the state transition diagram of FIG. 15.

Figure 8:
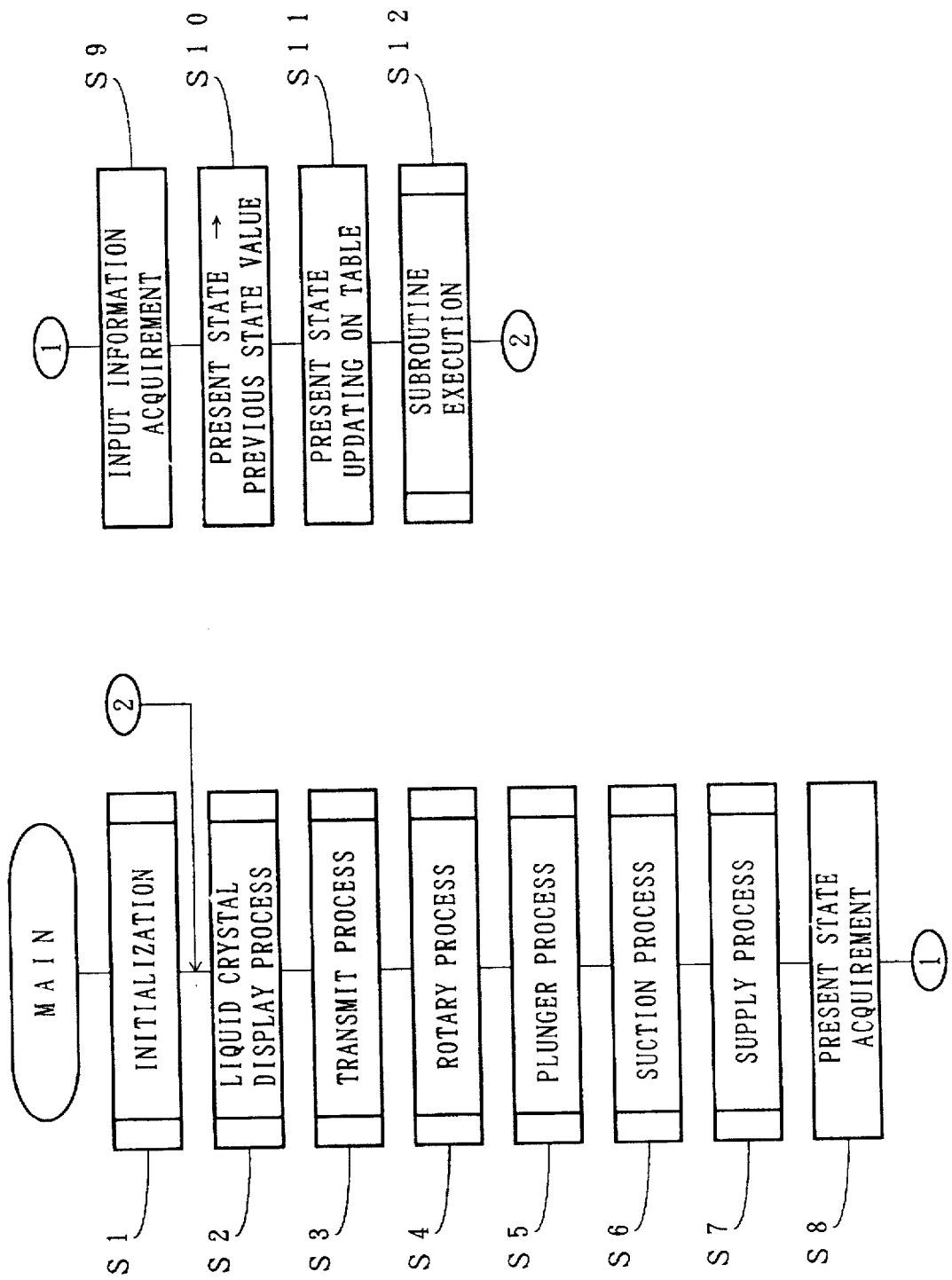
FIG. 8 is a main flow diagram showing the processing by the CPU as in FIG. 7.

The main routine shown in FIG. 8 is started by turning ON a power source. At the initial step S1, the main routine is initialized. Then, at a step S2, various operation is displayed by a liquid crystal display unit. Thereafter, at a step S3, various data is transmitted. At a step S4, a rotary actuator is rotated (Refer to FIG. 9). At next step S5, a plunger is actuated (Refer to FIG. 10). At a step S6, a seed attracting is conducted (Refer to FIGS. 11 and 12). Then, at next step S7, the seed is supplied.

Then, at a step S8, a present state is acquired. At a step S9, input information is acquired. Subsequently, at a step S10, a previous state stored in a work area of a RAM 103 is replaced with the present state. Thereafter, at a step S11, based on the present state acquired at the step S8 and the input information acquired at the step S9, the present state is updated by referring to the state transition table of FIG.

15. Then, at a step 12, when there is a subroutine to be executed, it is executed, and then returned to the step S2.

In the display of the operation by the liquid crystal display unit at the step S2, various operation is displayed on the liquid crystal display unit 110. When the producing apparatus is operated in a manual mode, the operating in the manual mode is displayed on the screen of the liquid crystal display unit 110. When the apparatus is not operated in the manual mode, i.e., when the apparatus is operated in an automatic mode, whether or not the operating conditions are effectively set or not is examined. If the conditions are not yet set, it is displayed on the screen of the liquid crystal display unit 110 that the parameter is invalid. When the parameter is invalid, the operation cannot be started. When the parameter is effective, the operating in the automatic mode is displayed on the screen of the liquid crystal display unit 110, and the operating (processing) performance and the operating (processing) target are displayed on the screen.

In the transmitting at the step S3, a process for transmitting various data from a controller 110 to a personal computer 100 is executed in response to a command from the personal computer 111 obtained by a reception interrupt (not shown).

Before the processes are described in detail, the way of observing the state transition diagram of FIG. 15 will be described. If a start input is fetched from the personal computer or an operating unit when the apparatus is stopped, the number of the performance of the processing is cleared, and all the solenoids are deenergized. And, the rotary/plunger is started to be returned to the origin. When an end input is fetched during the returning of the rotary/plunger to the origin, the rotary/plunger is forcibly stopped to the stopped state.

When a rotary stop input is fetched during the returning of the rotary/plunger to the origin, the state is set to a plunger origin returning state. When the plunger stop input is fetched during the returning of the rotary/plunger to the origin, the state is set to a rotary origin returning state. When the plunger stop input is fetched duping the returning of the plunger to the origin and the rotary stop input is fetched during the returning of the rotary to the origin, the state is set to a sucking/supplying state, and the vacuum-attraction by a suction tip 23 is started.

When a suction complete input is fetched during sucking/supplying, the state is set to supplying. When a supply complete input is fetched during the sucking/supplying, the state is set to the sucking. When the suction complete input is fetched during the sucking and the supply complete input is fetched during the supplying, the state is set to rotary rotation, and the movement of the rotary is started. When the rotary stop input is fetched in the rotary rotating state, the state is set to the sucking/supplying, the attracting by the suction tip 24 and the supplying by the suction tip 23 are started, and the above-mentioned operation is repeated until the number of the residue to be processed becomes "0". When the number of the residue to be processed becomes "0", the apparatus becomes an end queue state, the state is stopped in response to the plunger stop input, and all the operations are stopped.

The processes of the steps 4 to 7 in the above-mentioned main flowchart will now be sequentially described in detail.

Figure 9:
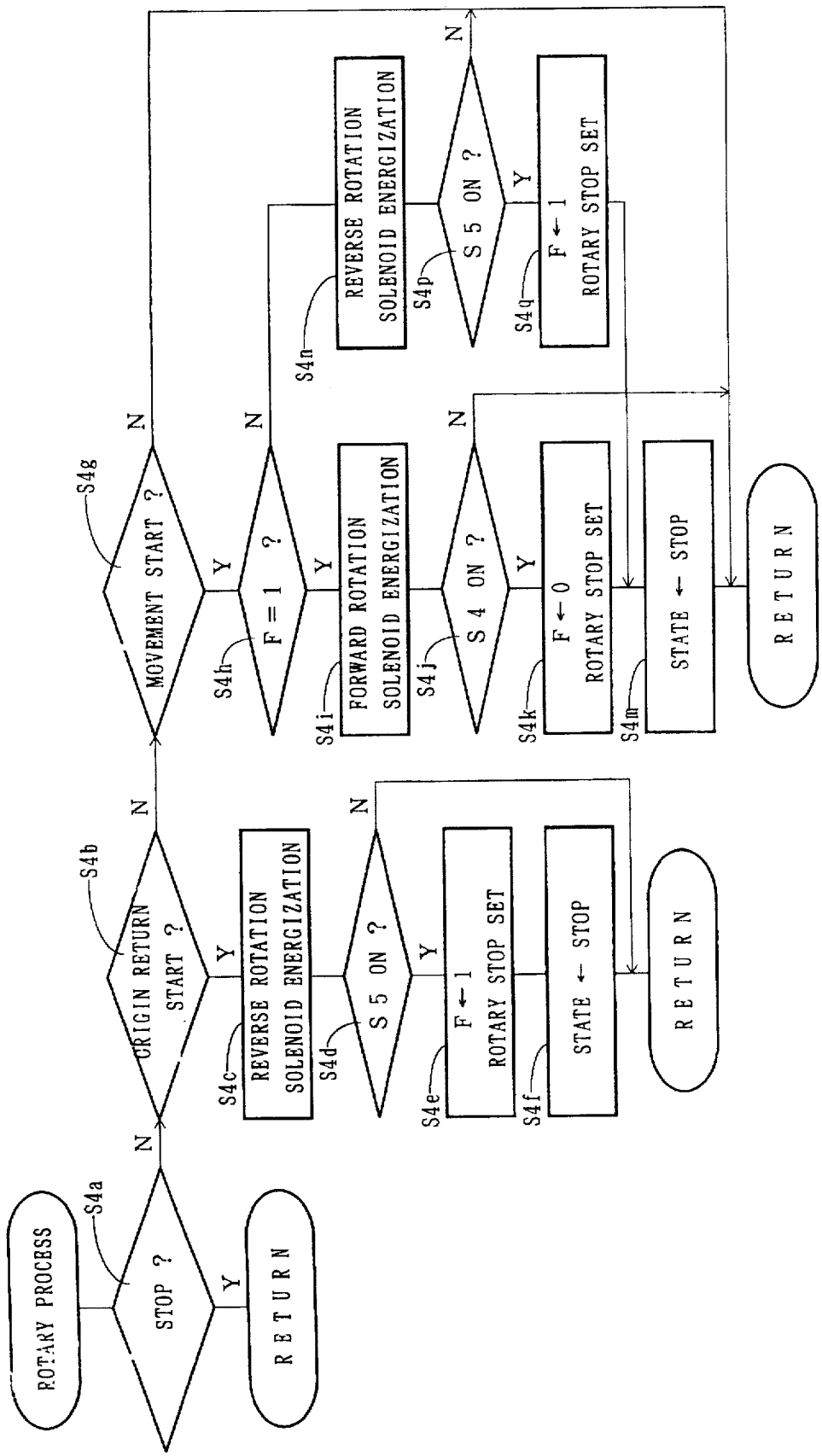
FIG. 9 is a flow diagram showing details of the rotary processing as in FIG. 8.

In the rotating of the rotary at the step S4, as shown in FIG. 9, at a step S4a, whether or not the present state is a stop state is determined. When the determination is YES, the process is returned to the main routine of FIG. 8, and advanced to the next step S5. When the gel-coated seed producing apparatus is in the stop state, the producing apparatus is started by a command from the personal computer 111. The present state is updated by referring to the state transition table at the step S11. When the apparatus is set from the stop state to an origin returning start state, the determination at the step S4a becomes NO, and the process is advanced to a step S4b for determining whether or not the present state is the origin returning start state, and the determination at the step S4b becomes YES.

When the determination at the step S4b is YES, the process is advanced to a step S4c. At the step S4c, the reverse rotation solenoid valve solenoid SOL4 is energized to reversely rotate the rotary actuator 20, and then the process is advanced to a step S4d. At the step S4d, whether or not a rotary position detecting sensor S5 is turned ON is determined. When the determination is NO, the process is returned to the main routine of FIG. 8, and advanced to the next step S5. When the determination at the step S4d is YES, the process is advanced to a step S4e. At the step S4e, a flag F is set to "1". After a rotary stop is set, the process is advanced to a step S4f, and the state is set to the stop state. Then, the process is returned to the main routine of FIG. 8, and advanced to the next step S5.

If the present state of the stop state is set to a rotary rotating start state, the determinations at the steps S4a to S4b become NO when the process enters the step S4 of the rotation of the rotary next time, and the process is advanced to a step S4g, and the determination at the step S4g becomes YES. When the determination at the step S4g becomes YES, the process is advanced to a step S4h, and whether or not the flag is "1" is determined.

When the determination at the step S4h is YES, namely, when the flag is "1", the process is advanced to a step S4i, the forward rotation solenoid valve solenoid SOL3 is energized to rotate the rotary actuator 20 forward, and then the process is advanced to a step S4j. At the step S4j, whether or not a rotary position detecting sensor S4 is turned ON is determined. When the determination is NO, the process is returned to the main routine of FIG. 8, and advanced to the next step S5. When the determination at the step S4j is YES, the process is advanced to a step S4k, a flag F is set to "0", a rotary stop is set, and then the process is advanced to a step S4m. Then, the state is set to the stop state, and then the process is returned to the main routine of FIG. 8, and advanced to the next step S5.

On the other hand, when the determination at the step S4h is NO, namely, when the flag is "0", the process is advanced to a step S4n, the reverse rotation solenoid valve solenoid SOL4 is energized to reversely rotate the rotary actuator 20, and then the process is advanced to a step S4p. At the step S4p, whether or not a rotary position detecting sensor S5 is ON is determined. When the determination is NO, the process is returned to the main routine of FIG. 8, and advanced to the next step S5. When the determination at the step S4p is YES, the process is advanced to a step S4q, the flag F is set to "1", and a rotary stop is set, and then the process is advanced to the step S4m.

Figure 10:
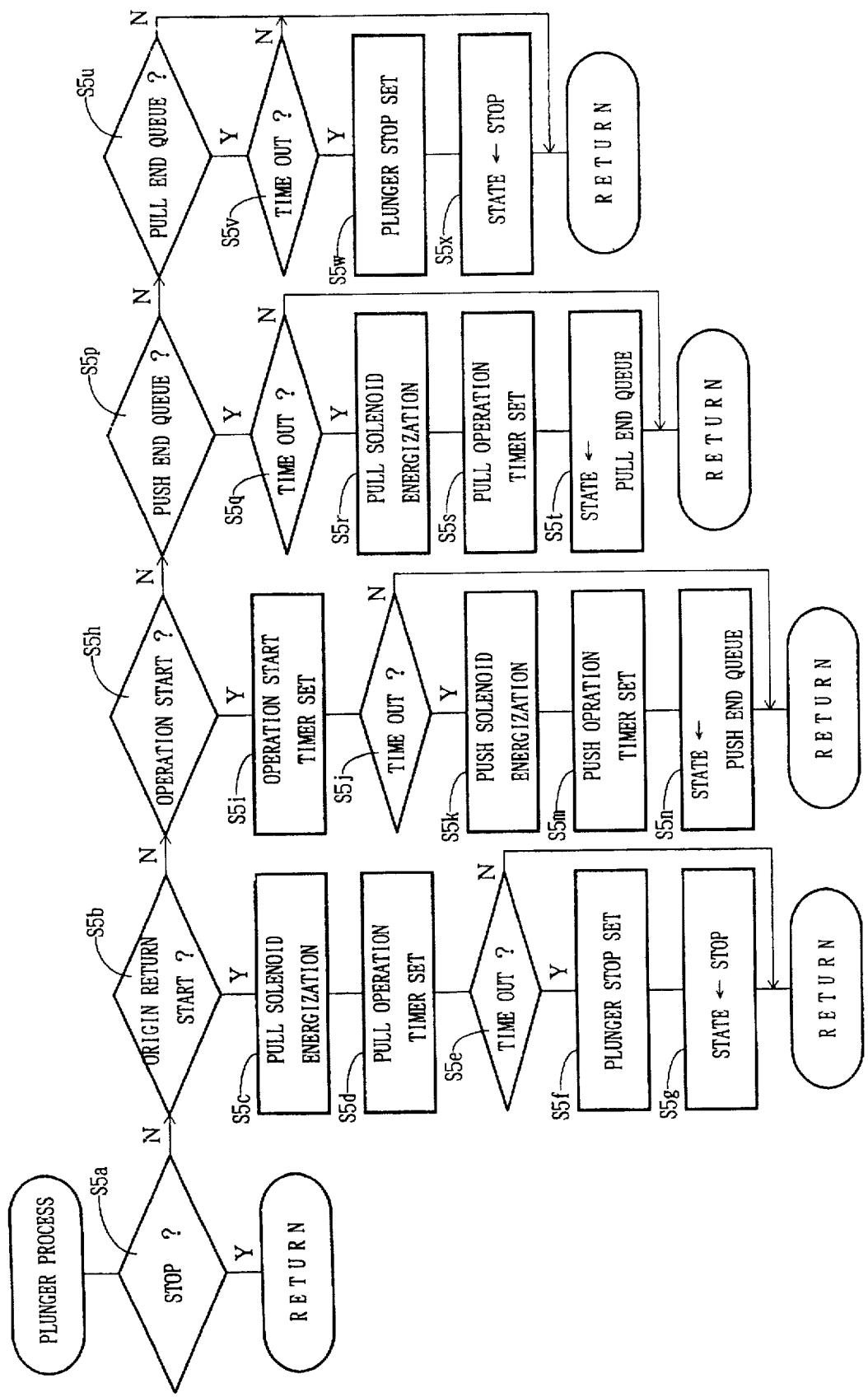
FIG. 10 is a flow diagram showing details of the plunger processing as in FIG. 8.

In the actuating of the plunger at the step S5, as shown in FIG. 10, at a step S5a, whether or not the present state is in the stop state is first determined. When the determination is YES, the process is returned to the main routine of FIG. 8, and advanced to the next step S6. When the gel-coated seed producing apparatus is in the stop state, the apparatus is started by a command from the personal computer 111, the present state is updated by referring to the state transition table at the step S11. When the apparatus is set from the stop state to an origin returning start state, the determination at the step S5a becomes NO, and the process is advanced to a step S5b for determining whether or not the present state is an origin returning start state, and the determination at the step S5b becomes YES.

When the determination at the step S5b is YES, the process is advanced to a step S5c, and a pull solenoid valve solenoid SOL2 is energized to start the backward operation of the reciprocating actuator. Then, the process is advanced to a step S5d, and a pull operation timer of a predetermined time is set. Thereafter, the process is advanced to a step S5e, and whether or not the timer set at the step S5d is time out is determined. When the determination is NO, the process is advanced to the main routine of FIG. 8, and advanced to the next step S6. When the determination at the step S5e is YES, namely, the timer set at the step S5d is time out, the process is advanced to a step S5f to set a plunger stop. Then the process is advanced to a step S5g, the state is set to the stop state, and then returned to the main routine of FIG. 8, and advanced to the next step S6.

When the present state is a plunger operation start, the determinations at the steps S5a to S5b become NO, and the process is advanced to a step S5h. The determination at the step S5h becomes YES, and the process is advanced to a step S5i. At the step S5i, an operation start timer of a predetermined time for waiting the start of the operation is set. Thereafter, the process is advanced to a step S5j. At the step S5j, whether or not the set timer is time out is determined. When the determination at the step S5j is NO, the process is advanced to the main routine of FIG. 8, and advanced to the next step S6.

When the determination at the step S5j is YES, namely, when the timer set at the step S5i is time out, the process is advanced to a step S5k, a push solenoid valve solenoid SOL1 is energized, and the forward operation of the reciprocating actuator is started. Then, the process is advanced to a step S5m, and a push operation timer of a predetermined time is set. Thereafter, the process is advanced to a step S5n, the state is set to a push end queue state. Then, the process is returned to the main routine of FIG. 8, and advanced to the next step S8. If the present state is set to the push end queue state at the step S5n, the determinations at the steps S5a, S5b and S5h become NO when the process enters the step S5 of actuating the plunger next time, and the process is advanced to a step S5p, and the determination at the step S5p becomes YES.

When the determination at the step S5p is YES, the process is advanced to a step S5q. At the step S5q, whether or not the push operating time of the timer set at the step S5m is time out is determined. When the determination at the step S5q is NO, the process is returned to the main routine of FIG. 8, and advanced to the next step S6. When the determination at the step S5q is YES, the process is advanced to a step S5r, the pull solenoid valve solenoid SOL2 is energized, and the backward operation of the reciprocating actuator is started. Then, the process is advanced to a step S5s, and a pull operating timer is set. Thereafter, the process is advanced to a step S5t, and the present state of a push end queue state is set to a pull end queue state. Then, the process is advanced to the step S6 of the main routine of FIG. 8. At the step S5t, if the present state is set to the pull end queue state, the determinations at the steps S5a, S5h, S5p become NO when the process enters the step S5 of actuating the plunger next time. Then, the process is advanced to a step S5u, and the determination at the step S5u becomes YES.

When the determination at the step S5u is YES, the process is advanced to a step S5v. At the step S5v, the pull operating timer set at the step S5s is observed to determine whether or not the pull operating timer is time out. When the determination at the step S5v is NO, namely, when the pull operating timer is not time out, the process is advanced to the step S8 of the main routine of FIG. 8. When the determination at the step S5v is YES, namely, when the pull operating timer is time out, the process is advanced to a step S5w and a plunger stop is set, and to next step S5x. Then, the present state of the pull end queue state is set to the stop state, and then the process is advanced to the step S8 of the main routine of FIG. 8.

Figure 11:
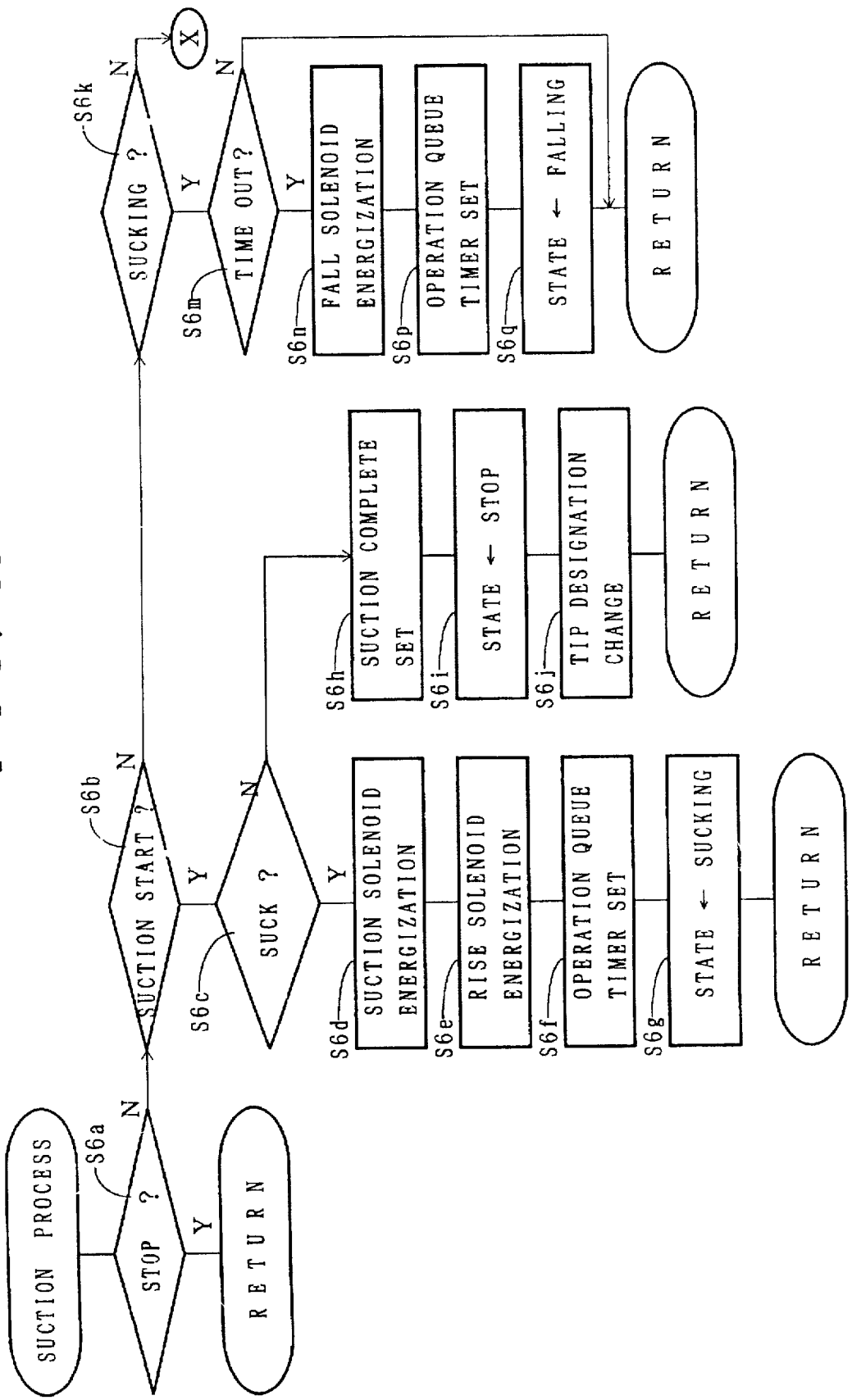
FIG. 11 is a flow diagram showing a part of the details of the sucking processing as in FIG. 8.
Figure 12:
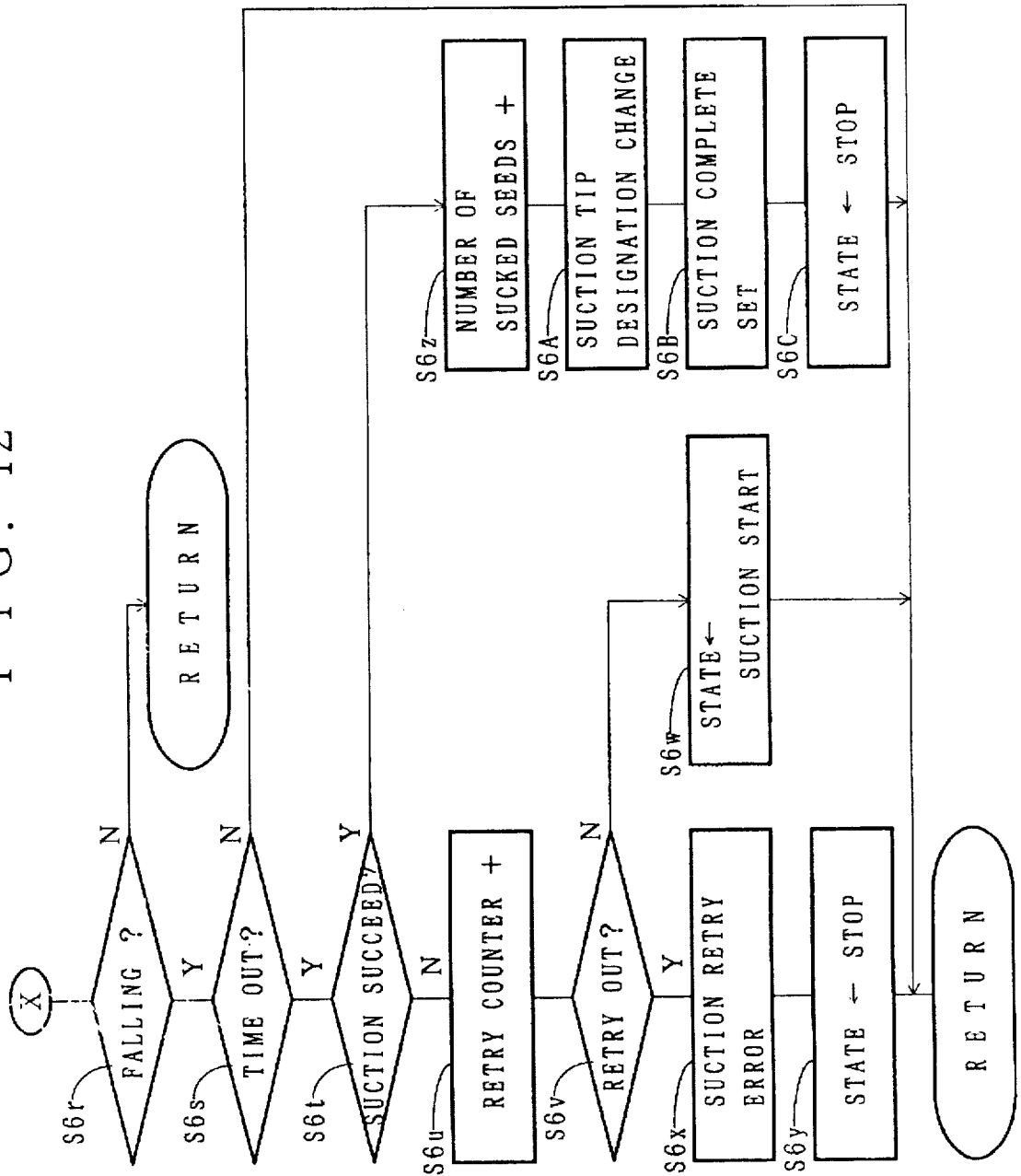
FIG. 12 is a flow diagram showing the remaining part of the details of the sucking processing as in FIG. 8.

In the sucking at the step S8, as shown in FIG. 11, at a step S6a, whether or not the present state is a stop state is determined. When the determination is YES, the process is returned to the main routine of FIG. 8, and advanced to the next step S7. As shown in the state transition diagram of FIG. 15, if the rotary stop is set when the present state is during the state of returning the rotary to the origin and the state of rotating the rotary, or if the plunger stop is set when it is during the state of returning the plunger to the origin, the present state is updated by referring to the state transition table at the step S11, and the present state is set to the start of sucking. When the present state is set to the sucking start state in this manner, the determination at the step S6a becomes NO. The process is advanced to a step S6b for determining whether or not the present state is a sucking start state, and the determination at the step S6b becomes YES.

When the determination at the step S6b is YES, the process is advanced to a step S6c, and whether or not there are residual seeds to be sucked, namely whether or not a target number is larger than the number of performance is determined. The step S6c is for preventing a seed from being during sucking at the time of end. When the determination at the step S6c is YES, namely, when the number of performance does not reach the target number, the process is advanced to a step S6d, and a suction solenoid valve solenoid SOL5 corresponding to the designated suction tip 23, 24 is energized to start the sucking by the suction tip 23, 24. Then, the process is advanced to a step S6e, the rise solenoid valve solenoid SOL7 is energized, and the rising of the elevation actuator is started. Thereafter, the process is advanced to a step S6f. At the step S6f, an operation queue timer is set. Then, the process is advanced to a step S6g, and the present state of the sucking start state is set to a sucking state. Then, the process is advanced to the step S7 of the main routine of FIG. 8.

When the determination at the step S6c is NO, namely, when the number of performance reaches the target number, the process is advanced to a step S6h without newly sucking so as to eliminate the seed during sucking at the time of ending, and suction complete is set. Then, the process is advanced to a step S6i, and the present state of the sucking start state is set to the stop state, and then the process is advanced to next step S6j. The designation of the tip that sucks is updated, and the process is then advanced to the step S7 of the main routine of FIG. 8.

As described above, if the present state is set to the sucking state at the step S6g, the determinations at the steps S6a and S6b become NO when the process enters the step S6 of the sucking next time, and the process is advanced to a step S6k, and the determination at the step S6k becomes YES. When the determination at the step S6k is YES, the process is advanced to a step S6m. At the step S6m, whether or not the time of the operation queue timer set at the step S6m is time out is determined. When the determination at the step S6m is NO, the process is advanced to the step S7 of the main routine of FIG. 8. When the determination at the step S6m is YES, the process is advanced to a step S6n, a fall solenoid valve solenoid SOL8 is energized, and the falling operation of the elevation actuator is executed. Thereafter, the process is advanced to a step S6n, the operation queue timer is set, and then the process is advanced to a step S6q. Then, the present state of the sucking state is set to falling, and then the process is advanced to the step S7 of the main routine of FIG. 8.

As described above, if the present state is set to a falling state at the step S6q, the determinations at the steps S6a, S6b and S6k become NO when the process enters the step S6 of the sucking next time. Then, the process is advanced to a step S6r of FIG. 12, and the determination at the step S6r becomes YES. When the determination at the step S6r is YES, the process is advanced to a step S6s. At the step S6s, whether or not the operation queue timer set at the step S6p is time out is determined. When the determination at the step S6s is NO, the process is advanced to the step S7 of the main routine of FIG. 8. When the determination at the step S6s is YES, the process is advanced to a step S6t. At the step S6t, whether or not the sucking by the designated suction tip 23, 24 is succeeded is judged according to the ON of the suction pressure sensor S1, S2 corresponding to the tip.

When the determination at the step S6t is NO, namely, when the sucking of a seed by the designated suction tip 23, 24 is not succeeded, the process is advanced to a step S6u, and a retry counter provided in the RAM 103 of the controller 100 is incremented. At next step S6v, whether or not it is retry out exceeding the counted value of the retry counter is determined. When the determination at the step S6v is NO, the process is advanced to a step S6w, whereat the present state of a falling state is set to suction starting, and then the process is advanced to the step S7 of the main routine of FIG. 8. When the determination at the step S6v is YES, the process is advanced to a step S6x, and the processing of a retry error such as generating a retry error signal is done. Then, the process is advanced to a step S6y, and the state is stopped. Then, the process is advanced to the step S7 of the main routine of FIG. 8.

When the determination at the step S6t is YES, namely, when the sucking of a seed by the designated suction tip 24 is succeeded, the process is advanced to a step S6z, and the number of the sucked seeds is incremented at the counter in the RAM 103 of the controller 100. Then, at next step S6A, the tip designation for sucking operation is updated. Thereafter, the process is advanced to a step S6B, and a suction complete is set. Then, the process is advanced to a step S6C, and the present state of falling state is set to the stop state. Then, the process is advanced to the step S7 of the main routine of FIG. 8.

Figure 13:
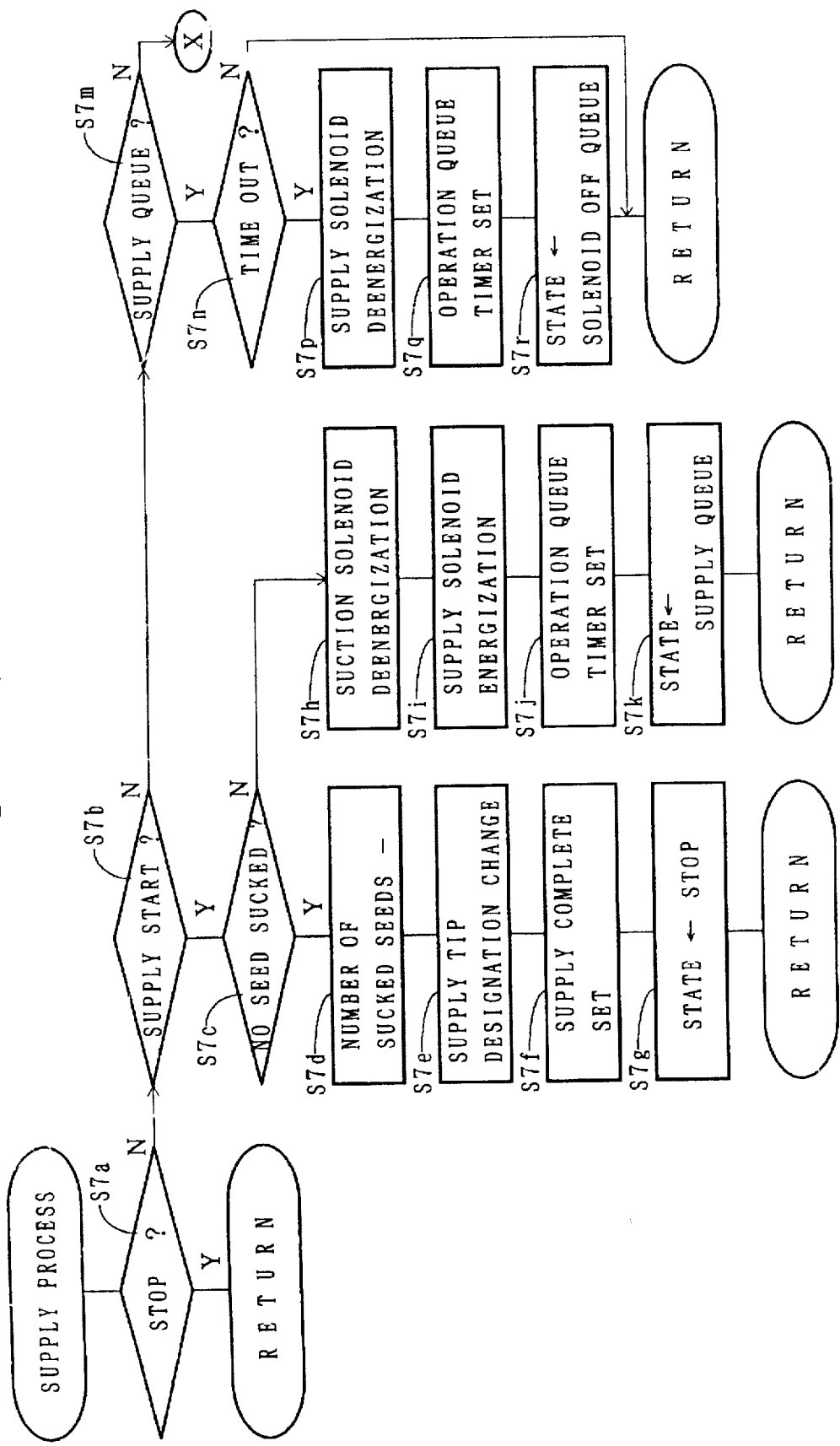
FIG. 13 is a flow diagram showing a part of the details of the supplying processing as in FIG. 8.
Figure 14:
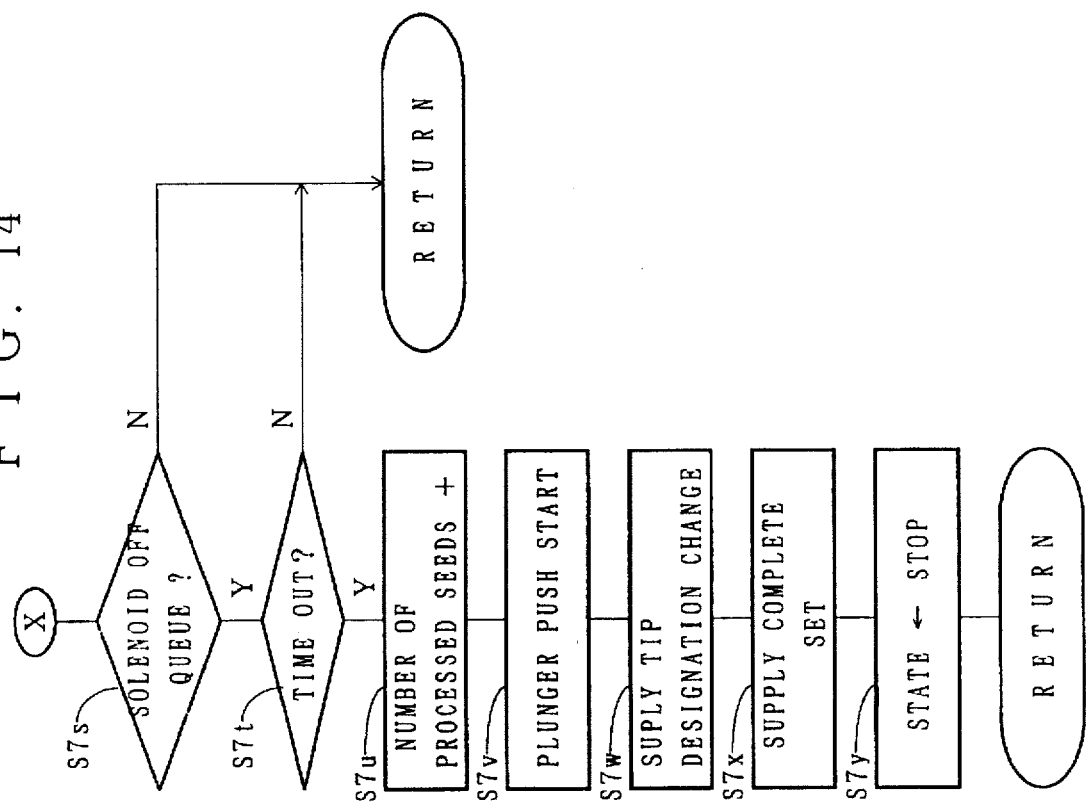
FIG. 14 is a flow diagram showing the remaining part of the details of the supplying processing as in FIG. 8.

At the step S7 of supplying seeds, as shown in FIG. 13, first at a step S7a, whether or not the present state is the stop state is determined. When the determination at the step S7a is YES, the process is returned to the main routine of FIG. 8, and advanced to the next step S8. As shown in the state transition diagram of FIG. 15, the present state is updated by referring to the state transition table at the step S11, and the present state is set to supply start. When the present state is thus in the supply start state, the determination at the step S7a becomes NO. Then, the process is advanced to a step S7b for determining whether or not the present state is the supply start state, and the determination at the step S7b becomes YES.

When the determination at the step S7b is YES, the process is advanced to a step S7c, and whether or not the tip does not have a seed sucked thereto is determined. The determination at the step S7c is executed according to whether or not the suction pressure senor S1, S2 corresponding to the designated suction tip 23, 24 is turned ON. When the determination at the step S7c is YES, namely, when a seed is not being sucked, the process is advanced to a step S7d, and the number of sucked seeds incremented at the step S6z is decremented. By this decrement, in case of unsucking, an error of the number of seeds and wasteful supplying operation are prevented. Thereafter, the process is advanced to a step S7e, and the suction tip 23, 24 for supplying is updated. Then, the process is advanced to a step S7f, and a supply complete is set. Subsequently, the process is advanced to a step S7g. After the present state of the supply start state is set to the stop state at the step S7g, the process is advanced to the step S8 of the main routine of FIG. 8.

When the determination at the step S7c is NO, namely, when a seed is being sucked, the process is advanced to a step S7h, and a suction solenoid valve solenoid SOL5 corresponding to the designated suction tip 23, 24 is deenergized. Then, at next step S7i, a supply solenoid valve solenoid SOL6 corresponding to the designated suction tip 23, 24 is energized, a positive pressure is supplied, and the seed being sucked is dropped. Thereafter, the process is advanced to a step S7j, an operation queue timer is set, and the process is advanced to a step S7k. Then, after the present state of the supply start state is set to the supply queue state at the step S7k, the process is advanced to the step S8 of the main routine of FIG. 8.

If the present state is set to the supply queue state at the step S7k, the determinations at the steps S7a and S7b become NO when the process enters the step S7 of supplying seeds next time, and the process is advanced to a step S7m. Then, the determination at the step S7m becomes YES. When the determination at the step S7m is YES, the process is advanced to a step S7n, and whether or not the operation queue timer set at the step S7j is time out is determined. If the operation queue timer is not time out, the process is advanced to the step S8 of the main routine of FIG. 8. When the determination at the step S7n is YES and the operation queue timer is time out, the process is advanced to a step S7p, and the supply solenoid valve solenoid SOL6 corresponding to the designated suction tip 23, 24 is deenergized. Thereafter, the process is advanced to a step S7q, and the operation queue timer is set. Then, the process is advanced to a step S7r. After the present state of the supply queue state is set to a solenoid OFF queue state at the step S7r, the process is advanced to the step S8 of the main routine of FIG. 8.

If the present state is set to the solenoid OFF queue state at the step S7r as described above, the determinations at the steps S7a, S7b and S7m become NO when the process enters the step S7 of supplying seeds next time, and the process is advanced to a step S7s. The determination at the step S7s becomes YES. When the determination at the step S7s is YES, the process is advanced to a step S7t, and whether or not the operation queue timer set at the step S7q is time out is determined. If the determination at the step S7t becomes NO, the process is advanced to the step S8 of the main routine of FIG. 8. If the determination at the step S7t is YES, the process is advanced to a step S7u, and the number of the processed at the counter in the RAM 103 of the controller 100 is incremented. Then, the process is advanced to a step S7v, and the reciprocating actuator is forwardly moved, and the pushing operation by the plunger is started.

Thereafter, the process is advanced to a step S7w, and the designation of the suction tip 23, 24 for supplying a seed is updated. Then, the process is advanced to a step S7x. At the step S7x, a supply complete is set, and then the process is advanced to a step S7y. After the present state of the solenoid OFF queue state is set to stop at the step S7y, the process is advanced to the step S8 of the main routine of FIG. 8. Incidentally, when the determinations at the steps S7a, S7b, S7m and S7s are NO, the process is advanced to the step S8 of the main routine of FIG. 8.

As described above, the seed vessel 31 is moved upwardly, and negative pressure is supplied from a negative pressure source to the suction tip 23, 24 in synchronization with the rising of the seed vessel, and a seed can be sucked or vacuum-attracted. The suction tip 23, 24 is inserted into the seeds contained in the seed vessel 31 to suck a seed. If a seed cannot be sucked, the seed vessel 31 is once lowered, and then raised. The operation is repeated until the seed suction is confirmed.

The confirmation of the suction of a seed by a suction tip 23, 24 is made by the suction pressure detecting sensor S1, S2 corresponding to the tip. The arm 21 is forwardly or reversely rotated by 180° following the lowering of the seed vessel 31 in response to the above confirmation, and the exchange of the positions of the suction tips 23 and 24 corresponding to the seed-attracting position and the seed-supplying position is conducted, and the same operation as described above is repeated. The order of the rotations is as described above.

When the suction tip 23, 24 is moved above the hollow cutting plunger 14 at the seed-supplying position, whether or not a seed is sucked to the suction tip 23, 24 is confirmed. If a seed is sucked, the supply of negative pressure from the negative pressure source is stopped. Instead, positive pressure is supplied from a positive pressure source, and the seed is dropped to be supplied. If a seed is not sucked, the arm is rotated until the other suction tip 23, 24 with a seed sucked thereto is moved above the hollow cutting plunger 14.

After the seed is dropped and supplied, the gel-pressurizing plunger 15 is moved front by the reciprocating actuator to push out gel. When the gel-pressurizing plunger 15 is pushed, the check valve is closed, and the gel is pushed out by the hollow cutting plunger 14, whereas when the gel-pressurizing plunger 15 is pulled, the hollow cutting plunger 14 is closed, and the check valve is opened to supply additional gel. These operations are continuously conducted to perform the processing. A curing vessel is provided under the hollow cutting plunger 14, and the gel is cured by the curing agent in the vessel.

As apparent from the above description by referring to the flowcharts of FIGS. 8 to 14, the CPU 101 of the controller 100 controls the rotary actuator 20 as the first drive source to move the suction tip 23, 24 to the seed-attracting position, and controls the elevation actuator as the second drive source when the suction tip 23, 24 has moved thereto to move the seed vessel 31 upwardly to allow the suction tip 23, 24 to suck a seed. If the suction tip 23, 24 cannot suck a seed by this first suction, the sucking operation is repeated. The suction tip 23, 24 which has sucked a seed at the seed-attracting position is moved to the seed-supplying position by controlling the rotary actuator 20. The suction is released at the seed-supplying position, and the seed is dropped to be supplied through the hollow portion of the cutting plunger 14, and the reciprocating actuator as the third drive source is controlled to move the gel-pressurizing plunger 15 front to open the hollow cutting plunger 14 and allow gel to be discharged.

The CPU 101 of the controller 100 is so operated as to stop the running of the apparatus when the counted value of the counter means 103-1 provided in the RAM 103 in the controller 100 for counting the number of operations in which the suction tip 23, 24 fails to suck a seed reaches a predetermined number of times.

Further, the CPU 101 moves the suction tip 23, 24 with a seed sucked at the seed-attracting position to the seed-supplying position by controlling the rotary actuator, confirms that the suction tip 23, 24 is having the seed at the seed-supplying position, stops the forward movement of the gel-pressurizing plunger 15 by the reciprocating actuator when the suction of the seed cannot be confirmed by the confirming operation, controls the rotary actuator to move the other suction tip 23, 24 with a seed sucked at the seed-attracting position to the seed-supplying position.

In the embodiment described above, only two suction tips are employed for the simplicity of description. However, an arbitrary number of suction tips other than two may also be employed within the scope of this invention.

In the embodiment described above, to drop and supply seeds from the suction tip at the seed-supplying position, the supply of negative pressure from the negative pressure source is released, and instead positive pressure is supplied from the positive pressure source. This is effective to forcibly drop the sucked seed, but is not always necessary, and the seed may be supplied by natural drop.

Further, in the embodiment described above, the CPU 101 of the controller 100 stops the running of the apparatus at the sucking operation when the counted value of the counter means 103-1 provided in the RAM 103 of the controller 100 for counting the number of operations in which the suction tip 23, 24 fails to suck a seed reaches a predetermined number of times. However, informing means for informing the stop of the running may be added so that the running is not only merely stopped, but also the stop of the running is informed to an operator as early as possible.

Moreover, in the embodiment described above, the seed vessel 31 is moved upwardly and downwardly by means of the elevation actuator. However, it may be so arranged that only the upward movement is conducted by the actuator, and the downward movement is conducted by using the force of a spring contracted in the downward direction. In this case, a lowering solenoid valve solenoid is unnecessary. Further, it is described in the above in connection with the flowcharts that the completion of moving the seed vessel 31 to the raised or lowered position is judged by the time out of the operation queue timer. However, instead, it may be judged according to the ON signals of rise detection sensor S3 and a fall detection sensor S6.

In addition, in the embodiment described above, the confirmation of the suction of a seed by the suction tip 23, 24 is conducted according to the ON signal of the suction pressure detecting sensor, and hence the structure is relatively simple. However, such suction confirming means is not always limited to this, and the presence or absence of a sucked seed may be directly confirmed by other means such as, for example, an optical sensor.

In the embodiment described above, air cylinders are used as the first to third drive sources. However, the present invention is not limited to the particular embodiment. For example, a drive source such as a stepping motor may be employed.

Having now fully described the invention, it will be apparent to one of ordinary skill in the art that many changes and modifications can be made thereto without departing from the spirit and scope of the invention as set forth herein.

What is claimed is:

1. An apparatus for producing gel-coated seeds comprising:

a seed-supplying unit connected to a nozzle unit:

said seed-supplying unit comprising:

a support member;

a plurality of suction tips fitted to said support member; and a first drive means for rotationally reciprocatingly driving said support member such that each suction tip of said plurality of suction tips is successively moved between a seed-sucking position and a seed-supplying position; and a second drive means for driving a seed vessel upwardly and downwardly;

said nozzle unit comprising:

a gel flow channel filled with a gel;

a gel-pressurizing plunger reciprocatably inserted into said gel flow channel, wherein said plunger, when moving in a forward direction, pressurizes said gel inside of said gel flow channel, and when moving in a rearward direction, causes an additional gel to flow into said gel flow channel;

a cutting plunger with a hollow portion axially extended therethrough, wherein said cutting plunger opens a valve when said gel inside of said gel flow channel is pressurized to allow said gel to discharge, a part of said gel which has thus been discharged dropping by said gel's own weight and a remainder of said gel forming a layer of said gel that closes said hollow portion at a lower end thereof; and a third drive means for driving said gel-pressurizing plunger to reciprocate in said gel flow channel;

said nozzle unit being disposed corresponding to said seed-supplying position and coating a seed with gel, which has been dropped and supplied from said seed-supplying unit through said hollow portion of said cutting plunger;

a controller for controlling said first drive means to move each suction tip of said plurality of suction tips between said seed-sucking position and said seed-supplying position, controlling said second drive means when one suction tip of said plurality of suction tips has moved to said seed-sucking position to move said seed vessel upwardly to allow said one suction tip of said plurality of suction tips to suck said seed thereto to perform a seed sucking operation, having said seed sucking operation repeated if said one suction tip of said plurality of suction tips fails to suck said seed by a first seed sucking operation, controlling said first drive means to move said one suction tip of said plurality of suction tips with said seed sucked thereto at said seed-sucking position to said seed-supplying position, releasing a suction at said seed-supplying position to allow said one suction tip of said plurality of suction tips to drop said seed to be supplied through said hollow portion of said cutting plunger, and controlling said third drive means to move said gel-pressurizing plunger forwardly so that said cutting plunger opens a valve to allow gel to flow out, wherein said controller includes a counter means for counting a number of sucking operations in which said one suction tip of said plurality of suction tips fails to suck said seed at said seed-sucking position, and said sucking operations are stopped when a counted value of said counter means arrives at a predetermined number of times.

2. The apparatus for producing gel-coated seeds according to claim 1, wherein said support member is a supporting arm having two suction tips of said plurality of suction tips being provided at opposite ends thereof.

3. The apparatus for producing gel-coated seeds according to claim 1, wherein said controller, after one suction tip of said plurality of suction tips with a seed sucked thereto at said seed-sucking position is moved to said seed-supplying position, confirms that said one suction tip of said plurality of suction tips sucks said seed at said seed-supplying position, stops said third drive means from being operated to move said gel-pressurizing plunger in a forward direction when said seed is not confirmed by said confirming operation, and controls said first drive means to move one other suction tip of said plurality of suction tips with a seed sucked thereto at said seed-sucking position to said seed-supplying position.

4. The apparatus for producing gel-coated seeds according to claim 3, wherein whether said one suction tip of said plurality of suction tips is sucking said seed at said seed-supplying position is confirmed by detecting an increase in a degree of negative pressure supplied to said one suction tip of said plurality of suction tips.

* * * * *